(12) United States Patent
Tian et al.

(10) Patent No.: US 9,295,982 B2
(45) Date of Patent: Mar. 29, 2016

(54) MOF-BASED HIERARCHICAL POROUS MATERIALS AND METHODS FOR PREPARATION

(71) Applicant: BEIJING STAR NEW MATERIAL CO., LTD., Beijing (CN)

(72) Inventors: Yunqi Tian, Dalian (CN); Yan Chen, Dalian (CN); Xun Liu, Dalian (CN)

(73) Assignee: Beijing Star New Material Co., Ltd., Beijing (CN)

( * ) Notice: Subject to any disclaimer, the term of this patent is extended or adjusted under 35 U.S.C. 154(b) by 111 days.

(21) Appl. No.: 14/246,142

(22) Filed: Apr. 6, 2014

(65) Prior Publication Data

US 2014/0212944 A1    Jul. 31, 2014

(30) Foreign Application Priority Data

Nov. 29, 2013    (CN) .......................... 2013 1 0629804

(51) Int. Cl.

| | |
|---|---|
| *B01J 20/04* | (2006.01) |
| *B01J 31/16* | (2006.01) |
| *B01J 20/22* | (2006.01) |
| *B01J 20/30* | (2006.01) |
| *B01J 20/28* | (2006.01) |
| *B01D 53/02* | (2006.01) |
| *B01J 20/02* | (2006.01) |
| *B82Y 30/00* | (2011.01) |

(52) U.S. Cl.
CPC ............. *B01J 31/1691* (2013.01); *B01D 53/02* (2013.01); *B01J 20/0207* (2013.01); *B01J 20/0218* (2013.01); *B01J 20/0229* (2013.01); *B01J 20/0248* (2013.01); *B01J 20/226* (2013.01); *B01J 20/28007* (2013.01); *B01J 20/2808* (2013.01); *B01J 20/28083* (2013.01); *B01J 20/28085* (2013.01); *B01J 20/3064* (2013.01); *B01J 20/3078* (2013.01); *B01J 20/3085* (2013.01); *B82Y 30/00* (2013.01); *B01D 2253/204* (2013.01); *B01D 2257/108* (2013.01); *B01D 2257/504* (2013.01); *B01D 2257/7025* (2013.01); *Y02C 10/08* (2013.01)

(58) Field of Classification Search
CPC .................................. B01J 20/04; B01J 23/02
USPC ............................................. 502/439, 527.14
See application file for complete search history.

(56) References Cited

U.S. PATENT DOCUMENTS 7,815,716 B2 * 10/2010 Mueller ................. B01D 53/02
502/402

* cited by examiner

*Primary Examiner* — Edward Johnson

(57) ABSTRACT

A series of MOF-based hierarchical porous material, namely IPD-mesoMOF-1~9, based on nanoscale MOFs of MIL-100 (Al, Fe, Cr, Sc and In), MIL-53(Al), HKUST-1, DUT-5, DUT-4, MIL-101(Cr), MIL-101NDC(Cr), MIL-101BPDC(Cr) and MIL-110 respectively, forming the permanent interparticle porosities by using close (or relatively close) packing, and preparation methods thereof. Modulated or functionalized IPD-mesoMOFs can be applied for gas adsorption and molecule separation (such as $CH_4$- and $CO_2$-adsorption, gasoline/diesel desulfurization and purification), catalyst loadings and molecular recognition/immobilization of biological macromolecules and enzymes.

8 Claims, 12 Drawing Sheets

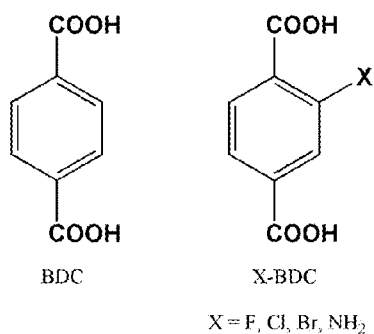
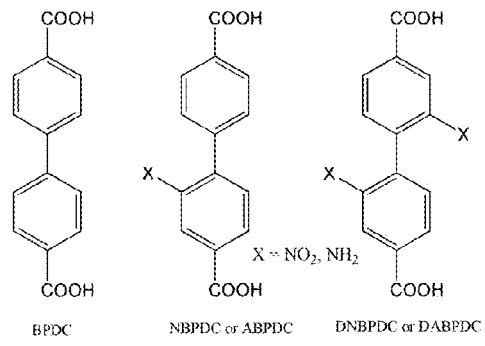
Fig. 1
Fig. 2
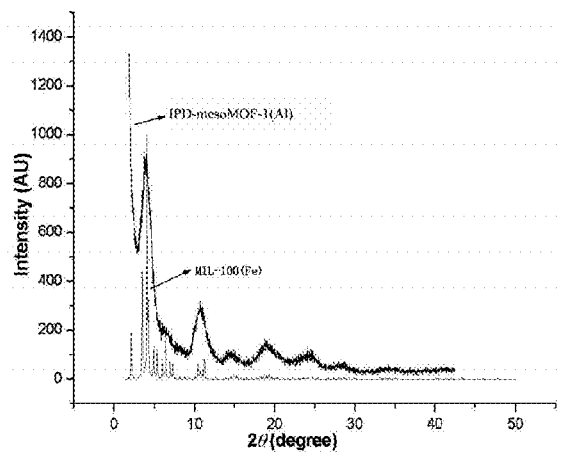
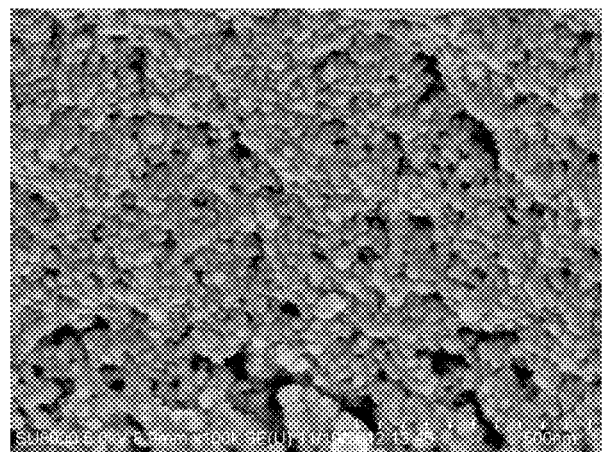
Fig. 3
Fig. 4

US 9,295,982 B2

MOF-BASED HIERARCHICAL POROUS MATERIALS AND METHODS FOR PREPARATION

BACKGROUND OF THE INVENTION

1. Field of the Invention

The invention relates to a series of MOF-based hierarchical porous materials based on nanoscale MOFs (NMOFs) and preparation methods thereof. In particular, the invention relates to a series of MOF-based hierarchical porous materials, namely IPD-mesoMOF-1~9, which are based on microporous MOFs of MIL-100(Al, Fe, Cr, Sc and In), MIL-53(Al), HKUST-1, DUT-5, DUT-4, MIL-101(Cr), MIL-101NDC(Cr), MIL-101BPDC(Cr) and MIL-110 respectively, forming permanent interparticle porosities by means of close packing; and preparation methods thereof.

2. Description of Related Art

Metal-organic framework (MOFs) porous materials are highly porous materials developed in the recent 20 years which are assembled from organic linkers and metal ions or cluster nodes. They are applied for gas storage (such as $H_2$, $CO_2$ and $CH_4$, etc.), molecule separation, catalysis and drug delivery. However, most MOFs are still microporous, where their pore apertures limit their applications in inorganic, organic and biological aspects. Although in recent years, surfactant templating method has led to several hierarchical porous MOFs materials (pore aperture up to 20 nm and pore volume less than 0.1 $cm^3/g$), this method is obviously not effective as it has been extensively utilized in synthesis of mesoporous silica and metal oxides (pore aperture ranging from 2 to 50 nm). Hierarchical porous MOF materials comprising micropores, mesopores and macropores has not yet been reported.

SUMMARY OF THE INVENTION

It is an object of the invention to provide a series of MOF-based hierarchical porous materials, namely IPD-mesoMOFs, which comprise micropores (smaller than 2 nm) and mesopores (2-50 nm), or comprise micropores (smaller than 2 nm), mesopores (2-50 nm) and macropores (larger than 50 nm), and preparation methods thereof. The IPD-mesoMOFs are generated from close or relatively close packing of the well-known NMOFs, which have high thermal stability, facile synthesis methods with good reproducibility, and are suitable for large-scale industrial production.

The invention provides the aforementioned series of MOF-based hierarchical porous materials and the preparation methods thereof which overcome the restraint of the traditional concept that formation of mesoporous MOFs can only be achieved by means of large rigid organic ligands or surfactant templating. It is considered that stable permanent interparticle porosity can be created with any MOFs as long as it is prepared as NMOF particles. Assuming that the NMOF particles are sufficiently small, they can aggregate into monoliths through coordination bonds formed between free metal coordination sites and organic residues on the surfaces and edges of the NMOF particles in mutual contact, sustaining a permanent interparticle porosity. Thereby, our strategy avoids the problems of high production cost for the synthesis of particular slender ligands, poor thermal stability and interpenetration of the MOF structures brought by increasing MOF aperture through increasing length of the rigid organic ligands and the problems arose from surfactant-templated mesoporous MOFs (ST-mesoMOFs): 1) unlike the amorphous pore-wall nature of inorganic mesoporous materials, the mesopore walls of some ST-mesoMOFs are based on microporous or nanoscale MOF single crystals, while the mesopores are imprints remained from the surfactant micelles which are mixed into the MOF single crystals. However, all crystalline substance has a natural instinct to expel non-building blocks outside its crystal body, that is why those ST-mesoMOFs exhibit only a low mesopore volume (less than 0.1 $cm^3/g$); 2) for some of the ST-mesoMOFs with pore walls consisting of NMOF particles, the surfactant micelles must be big enough to match with the size of NMOF particles. Otherwise, the surfactant cannot serve as the template, but the filler in the micropores (as well as the interparticle pores) is hard to be removed afterward; and 3) more important is that many MOFs have to be prepared hydrothermally (or solvothermally) at a temperature over 100° C. Under such a synthesis condition, it is not feasible for most surfactants to form the supramolecular micelles. That is why only a limited numbers of ST-mesoMOFs have been reported so far and they are mostly based on MOF of HKUST-1, which can be synthesized at a temperature below 100° C.

The MOF types of the series of MOF-based hierarchical porous material IPD-mesoMOF-n (n=1-9) of the invention are respectively MIL-100(Al, Fe, Cr, Sc and In), MIL-53(Al), HKUST-1, DUT-5, DUT-4, MIL-101(Cr), MIL-101NDC(Cr), MIL-101BPDC(Cr) and MIL-110, all known for good thermal stability. They all have rigid micro-MOF architectures, therefore, demonstrating excellent thermal stability. By preparing the aforementioned MOFs as small MOF nanoparticles and further controlling their stacking densities, monolithic aggregates with permanent interparticle pores of 2-50 nm are produced.

The series of MOF-based hierarchical porous materials IPD-mesoMOF-n (n=1-9) of the invention are based on MOF nanoparticles. Assuming to be uniform rigid spheres and they could be closely stacked with ordered octahedral interparticle holes, then, the relationship between the diameters of interparticle hole ($\phi_h$) and spherical NMOF particles ($\phi_s$) can be expressed as $\phi_h \approx 0.414\phi_s$. The interparticle porosity dominating mesoMOFs (IPD-mesoMOFs) with a pore diameter of $2 \leq \phi_s \leq 50$ nm can be prepared by controlling the size of NMOF particles within the range of 5 nm$\leq \phi_m \leq$120 nm. Therefore, preparing sufficiently small NMOF particles (less than 120 nm) and making them closely packed should be a crucial criteria for generating the IPD-mesoMOF-nA (n=1-9), as claimed in the invention. By mixing NaCl nanoparticles of size 50-500 nm as the hard template with the gel of an IPD-mesoMOF to be, then allowing the gelatinous mixture to dry, the raw product of B-Form MOF hierarchical porous materials, namely IPD-mesoMOF-nB (n=1-9) containing micropores, mesopores and macropores is formed. After washing away the NaCl template with water and extracting by-products and starting materials with ethanol, the final purified IPD-mesoMOF-nB (n=1-9) is obtained as monolithic xerogel.

IPD-mesoMOF-nA and IPD-mesoMOF-nB (n=1-9) of the invention are monolithic xerogels aggregating from gelatinous NMOF particles by desolvation. Their micropores are originated from the NMOFs, the mesopores from the interparticle porosity of the aggregated NMOFs, and the macropores from the NaCl nanoparticle templates of size larger than 50 nm or by supercritical $CO_2$ drying. The appearance of the IPD-mesoMOF materials shows as transparent, semitransparent or opaque particles depending on the size of their mesopore (i.e. the stacking density of the MOF nanoparticles). These IPD-mesoMOFs exhibit large Brunauer-Emmett-Teller (BET) surface areas, generally high pore volume, and the tunable mesopore aperture of the same type of IPD-mesoMOFs varies from a few nanometers to over a dozen nanometers. Furthermore, the MOF-based hierarchical porous materials synthesized by the present method have high yields and are suitable for large-scale production. Modulated or functionalized IPD-mesoMOFs can be applied for gas adsorption and molecule separation (such as $CH_4$- and $CO_2$-adsorption, gasoline/diesel desulfurization and purification), catalyst loadings and molecular recognition/immobilization of biological macromolecules and enzymes.

The hierarchical porous materials of the invention, namely IPD-mesoMOF-1~9, show good thermal stability with their MOF structures unchanged at 150° C. under vacuum for 12 hours. Their mesopore walls exhibit various MOF microcrystalline architectures with one- or three-dimensional channels and different micropore apertures.

The hierarchical porous materials of the invention, namely IPD-mesoMOF-1~9, are based on the following MOF structures: MIL-100(Al, Fe, Cr, Sc and In), MIL-53(Al), HKUST-1, DUT-5, DUT-4, MIL-101(Cr), MIL-101NDC(Cr), MIL-101BPDC(Cr) and MIL-110; the MOF nanoparticles must be relatively even and their particle size must be smaller than 120 nm. Thus, close or relatively close packing MOF nanoparticles can afford the expected interparticle mesopores of pore aperture in the range of 2-50 nm. The density of the MOFs must be low enough to allow the NMOF particles of a certain size aggregate through the interparticle interaction forces, forming permanent interparticle porosity.

The hierarchical porous material of the invention, namely IPD-mesoMOF-1~9, are prepared as monolithic xerogel with micropores and mesopores, forming A-Form of IPD-mesoMOF-1~9; monolithic xerogel with micropores, mesopores and macropores, forming B-Form of IPD-mesoMOF-1~9; and monolithic aerogels with micropores, mesopores and macropores with extra large surface area by means of supercritical CO2 drying, forming C-Form of IPD-mesoMOF-1~9.

The preparation methods for the hierarchical porous IPD-mesoMOF-1~9 of the invention are demonstrated as follows:

(1) Composition of Starting Materials:

(a) For IPD-mesoMOF-1 (based on MOF of MIL-100(M), M=$Fe^{3+}$, $Al^{3+}$, $Cr^{3+}$, $Sc^{3+}$ and $In^{3+}$)

a metal salt ($M^{3+}$) selected from nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); benzene-1,3,5-tricarboxylic acid (BTC) as ligand; and a solvent; the molar ratio of each component is as follows: $M^{3+}$:benzene-1,3,5-tricarboxylic acid (BTC):solvent=2:1:200-500;

(b) For IPD-mesoMOF-2 (based on MOF of MIL-53(Al))

an aluminum salt selected from nitrate ($NO_3^-$), sulfate ($SO_4^{2-}$) and perchlorate ($ClO_4^-$); 1,4-p-phthalic acid (BDC) or 2-X-substituted 1,4-p-phthalic acid (X-BDC) (X=F, Cl, Br, I, $NO_2$ or $NH_2$) as organic ligand; and a solvent; the molar ratio of each component is as follows: $Al^{3+}$:BDC (or X-BDC):solvent=1.2:1:400-800;

(c) For IPD-mesoMOF-3 (based on MOF of HKUST-1)

copper acetate, copper formate or copper propionate; benzene-1,3,5-tricarboxylic acid (BTC) as ligand; and a solvent; the molar ratio of each component is as follows: $Cu^{2+}$:benzene-1,3,5-tricarboxylic acid ligand (BTC):solvent=2:1:200-500;

(d) For IPD-mesoMOF-4 (based on MOF of DUT-5)

an aluminum salt selected from nitrate ($NO_3^-$), sulfate ($SO_4^{2-}$) and perchlorate ($ClO_4^-$); an organic ligand selected from 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) and 2,2'-diamino-4,4'-biphenyldicarboxylic acid (DABPDC); and a solvent; the molar ratio of each component is as follows: $Al^{3+}$:BPDC (NBPDC, ABPDC, DNBPDC or DABPDC):solvent=1.4:1:800-1400;

(e) For IPD-mesoMOF-5 (based on MOF of DUT-4)

an aluminum salt selected from nitrate ($NO_3^-$), sulfate ($SO_4^{2-}$) and perchlorate ($ClO_4^-$); 2,6-naphthalenedicarboxylic acid (NDC) as organic ligand; and a solvent; the molar ratio of each component is as follows: $Al^{3+}$:2,6-naphthalenedicarboxylic acid (NDC):solvent=1.4:1:800-1400;

(f) For IPD-mesoMOF-6 (based on MOF of MIL-101 (Cr))

a trivalent Cr salt selected from nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); 1,4-p-phthalic acid (BDC) or 2-X-substituted 1,4-p-phthalic acid (X-BDC) (X=F, Cl, Br, I, $NO_2$ or $NH_2$) as organic ligand; and a solvent; the molar ratio of each component is as follows: $Cr^{3+}$:BDC (or X-BDC):solvent=1.2:1:800-1400;

(g) For IPD-mesoMOF-7 (based on MOF of MIL-101 NDC(Cr))

a trivalent Cr salt selected from nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); 2,6-naphthalenedicarboxylic acid (NDC) as organic ligand; and a solvent; the molar ratio of each component is as follows: $Cr^{3+}$: 2,6-naphthalenedicarboxylic acid (NDC): solvent=1.2:1:800-1400;

(h) For IPD-mesoMOF-8 (based on MOF having MIL-101 topological structure formed by Cr (III) and BPDC)

a trivalent Cr salt selected from nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); an organic ligand selected from 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) and 2,2'-diamino-4,4'-biphenyldicarboxylic acid (DABPDC); and a solvent; the molar ratio of each component is as follows: $Cr^{3+}$:BPDC (NBPDC, ABPDC, DNBPDC or DABPDC):solvent=1.1:1:1000-2000; and (i) For IPD-mesoMOF-9 (based on MOF of MIL-110)

aluminum nitrate ($NO_3^-$), aluminum sulfate ($SO_4^{2-}$) or aluminum perchlorate ($ClO_4^-$); benzene-1,3,5-tricarboxylic acid (BTC) as ligand; and a solvent; the molar ratio of each component is as follows: $Al^{3+}$: benzene-1,3,5-tricarboxylic acid (BTC): solvent=3:1:120-300;

(2) Reaction Solvent:

The solvent is a fatty alcohol of less than 5 carbon atoms or a mixed solvent; the mixed solvent is a fatty alcohol in combination with N,N-dimethylformamide (DMF) or mixtures of two or more fatty alcohols, with the ratio of each component being adjusted if desired;

(3) Reaction Conditions:

The MOF-based hierarchical porous materials (except IPD-mesoMOF-3) are synthesized by solvothermal or microwave synthesis methods. The reaction temperatures are as follows:

For IPD-mesoMOF-1(Fe, Al, Sc and In): 90-100° C., solvothermal treatment for 10-24 hr, or microwave heating for 3-5 min;

For IPD-mesoMOF-1(Cr): 130-160° C., solvothermal treatment for 4-5 hr, or microwave heating for 2-3 min;

For IPD-mesoMOF-2: 90-120° C., solvothermal treatment for 14-24 hr, or microwave heating for 8-12 min;

For IPD-mesoMOF-3: room temperature 20-35° C., ultrasonic treatment for 0.5-2 hr;

For IPD-mesoMOF-4: 110-130° C., solvothermal treatment for 18-28 hr, or microwave heating for 8-12 min;

For IPD-mesoMOF-5: 110-130° C., solvothermal treatment for 18-28 hr, or microwave heating for 8-12 min;

For IPD-mesoMOF-6: 130-160° C., solvothermal treatment for 3-5 hr, or microwave heating for 3-5 min;

For IPD-mesoMOF-7: 130-160° C., solvothermal treatment for 3-5 hr, or microwave heating for 3-5 min;

For IPD-mesoMOF-8: 130-160° C., solvothermal treatment for 3-5 hr, or microwave heating for 3-5 min; and For IPD-mesoMOF-9: 90-120° C., solvothermal treatment for 14-24 hr, or microwave heating for 8-12 min;

(4) Regulation of Stacking Density of the MOF Nanoparticles:

(i) adding tetraalkylammonium halide (alkyl group is selected from methyl, ethyl, propyl and butyl; halide ion is Cl⁻ or Br⁻) into the reaction mixture as filler and homogenizer to create expanded and uniform interparticle mesopores. By changing the type and amount of tetraalkylammonium halide used, IPD-mesoMOF-n with various pore apertures can be prepared. The hierarchical porous material (xerogel) obtained comprising micropores and mesopores, termed as A-Form material, is marked as IPD-mesoMOF-nA (n=1-9); or (ii) adding NaCl nanoparticles of 50-500 nm into the reaction mixture at a molar ratio of MOF constituting metal ion to NaCl nanoparticle ranging from 1:1 to 1:10 to obtain hierarchical porous material (xerogel) comprising micropores, mesopores and macropores, termed as B-Form material, marked as IPD-mesoMOF-nB (n=1-9); or (iii) drying the sol/gel of IPD-mesoMOF-n (n=1-9) with supercritical $CO_2$ to obtain hierarchical porous material (aerogel) comprising micropores, mesopores and macropores, termed as C-Form material, marked as IPD-mesoMOF-nC (n=1-9); and (5) Post-Treatment of Materials:

The reaction mixture is cooled to room temperature upon completion of the reaction. The resulting sol (or gel) is processed to monolithic xerogel by: 1) filtration/centrifugation and then allow the filtrate/precipitate to dry; or 2) directly evaporating the solvent in air (IPD-mesoMOF-3 has to be dried at 130° C. under vacuum for at least 4 hr after formation as xerogel). The xerogel obtained is extracted and washed with Soxhlet extractor for more than 6 hr in anhydrous ethanol or methanol, and then desolvated under vacuum to afford A-Form of the MOF-based hierarchical porous material. For delivering B-Form material under the same conditions, the same procedure is conducted except that the xerogel obtained is washed with deionized water before the Soxhlet extraction.

The invention provides a method for regulating the size of mesopores during the preparation of the series of the MOF-based hierarchical porous materials, namely IPD-mesoMOF-nA, which comprises adding tetraalkylammonium halide into the reaction mixture and extracting with ethanol or methanol in Soxhlet extractor, wherein the alkyl group is selected from methyl, ethyl, propyl and butyl; and the halide ion is Cl⁻ or Br⁻.

The invention provides a method for regulating the size of mesopores during the preparation of the series of the MOF-based hierarchical porous materials, namely IPD-mesoMOF-nA, wherein a mixed solvent of fatty alcohols of less than 5 carbon atoms is used.

The invention provides a preparation method for MOF-based hierarchical porous materials, namely IPD-mesoMOF-nB, which comprises adding NaCl nanoparticles into the reaction mass of the IPD-mesoMOF-nA Form material, wherein particle size of NaCl nanoparticles is 50-500 nm and the molar ratio of MOF constituting metal ion to NaCl nanoparticle ranges from 1:1 to 1:10, and washing with water to remove the NaCl template.

The invention provides use of the MOF-based hierarchical porous materials, namely IPD-mesoMOF-n, in gas adsorption and storage, purification and desulfurization of gasoline and diesel, catalyst loadings and biological macromolecule immobilization.

In a preferred embodiment, the gas is $H_2$, $CH_4$ or $CO_2$; the impurities in gasoline and diesel are sulfur-containing heterocyclic aromatic (including other aromatic hydrocarbon or heterocyclic aromatic hydrocarbon); the catalysts are organic/inorganic compounds/metal or clusters; and the biological macromolecules are natural proteins (including biological enzymes) and nucleic acid molecules (including virus).

The invention provides a MOF-based hierarchical porous material and its preparation method, and the advantages are as follows:

1) IPD-mesoMOF-n (n=1-9) according to the invention is based on MOFs having good stability and can be made into sufficiently small nanoparticles which can be aggregated into IPD-mesoMOF monolithic xerogel. Thus, suitable IPD-mesoMOF-n (n=1-9) can be prepared from various microporous MOFs to meet the requirements of the applications;

2) All IPD-mesoMOF-n (n=1-9) materials according to the invention have tunable mesopores with large specific surface area and the mesopore apertures can be obtained within the mesoscopic range of 2-50 nm. For the same MOF type, the tunable mesopore aperture can vary from several nanometers to a dozen of nanometers; and MOF-based hierarchical porous materials exhibit large pore volume, with the largest over 3 $cm^3/g$;

3) IPD-mesoMOF-n (n=1-9) of the invention is based on MOFs which have good thermal stability, and the formation of MOF-based hierarchical porous materials-n (n=1-9) of the invention does not change the thermal stability of the original MOFs; and 4) The synthetic method for IPD-mesoMOF-n (n=1-9) of the invention is simple with good reproducibility and suitable for large-scale industrial production.

The above and other objects, features and advantages of the invention will become apparent from the following detailed description taken with the accompanying drawings.

BRIEF DESCRIPTION OF THE DRAWINGS

FIG. 1 shows the structural formula of 1,4-p-phthalic acid (BDC) or 2-X-substituted 1,4-p-phthalic acid (X-BDC) (X=F, Cl, Br, I, $NO_2$ or $NH_2$);

FIG. 2 shows the structural formula of 4-4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) or 2,2'-diamino-4,4'-biphenyldicarboxylic acid (DABPDC);

FIG. 3 shows an X-ray powder pattern of IPD-mesoMOF-1A(Al);

FIG. 4 shows a scanning electron microscopy (SEM) image of IPD-mesoMOF-1A(Al);

DETAILED DESCRIPTION OF THE INVENTION

Figure 5:
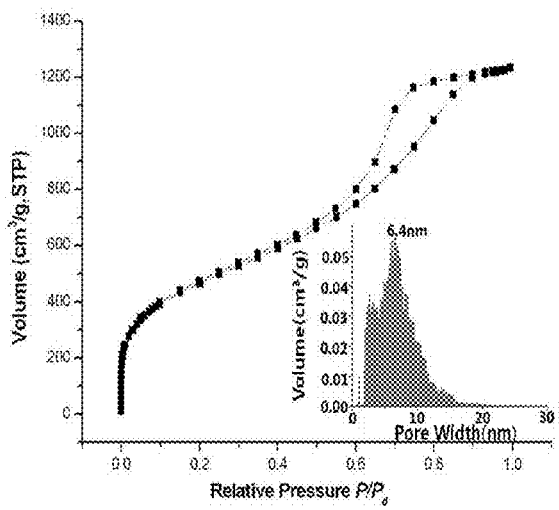
FIG. 5 shows a nitrogen adsorption isotherms and pore size distribution of IPD-mesoMOF-1A(Al)

"Range" disclosed herein is in the form of lower limit and upper limit. There may be one or more lower limit, and one or more upper limit respectively. Given range is defined by a lower limit and an upper limit. Selected lower and upper limits define the particular range boundaries. All the ranges can be defined by such way are containable and combinable, that is, any lower limit can combine with any upper limit to form a range. For example, a range with 2000-6000 and 50-200 listed as specific parameters should be understand that the ranges of 2000-5000 and 50-210 are also expectable. Additionally, if minimum range values of 1 and 2 are listed, and if maximum range values of 3, 4 and 5 are listed, the following ranges can all be expected: 1-3, 1-4, 1-5, 2-3, 2-4 and 2-5.

In the invention, unless otherwise indicated, the content range of each components of the composition and its preferred range can be combined with each other to form new technical solutions.

In the invention, unless otherwise indicated, all "part" and percentage (%) refer to percentage by weight.

In the invention, unless otherwise indicated, the sum of percentages of all components of the composition is 100%.

In the invention, unless otherwise indicated, the numerical range "a-b" means abbreviated expression of any real number between a and b, where a and b are real numbers. For example, numerical range "0-5" means all real numbers between 0 and 5 have been listed in herein, and "0-5" is abbreviated expression of combinations of these values.

If not otherwise stated, the basis for percentages (including percentage by weight) according to the invention is the total weight of the composition.

In the invention, unless otherwise indicated, all embodiments and preferred embodiments mentioned herein may be combined with each other to form new technical solutions.

In the invention, unless otherwise indicated, all technical features and preferred features mentioned herein may be combined with each other to form new technical solutions.

In the invention, unless otherwise indicated, all steps mentioned herein may be sequentially performed, and can be randomly performed, but sequential performance is preferred. For example, the method comprises the steps of (a) and (b), indicating that the method may include the steps of sequential performance of (a) and (b), and may also include the steps of sequential performance of (b) and (a). For example, the method may further include the step of (c), indicating the step (c) can be added in the method in any order. For example, the method may comprise the steps of (a), (b) and (c), may also include the steps of (a), (c) and (b), may also include the steps of (c), (a) and (b) and the like.

In the invention, unless otherwise indicated, the "include" mentioned herein means an open type, and also can be closed type. For example, the "include" may represent that it may also contain other components not listed, and also may include only the listed components. As used herein, "containing", "having" or "including" include "comprising", "mainly constituted of . . . ", "essentially composed of . . . " and "consisted of . . . "; "mainly consisted of . . . ", "essentially composed of . . . ", and "constituted of . . . " belong to the subordinate concepts of "containing", "having" or "including".

Features mentioned in the invention and features mentioned in the examples may be combined. All of the features disclosed in this specification may be used simultaneously in any forms of combination; and each feature disclosed in the specification may be substituted by any alternative features providing same, equal or similar purpose. Therefore, unless otherwise specified, the disclosed features are only common examples of equal or similar features.

If not specifically illustrated, all materials of the invention may be commercially available; or can be prepared according to conventional methods in the art. Unless otherwise defined or specified, all professional and scientific terms used herein have the same meanings as those well-known by the skilled in the art. Furthermore, any methods and materials similar or equal to those described can be used in the methods of the invention.

Figure 6:
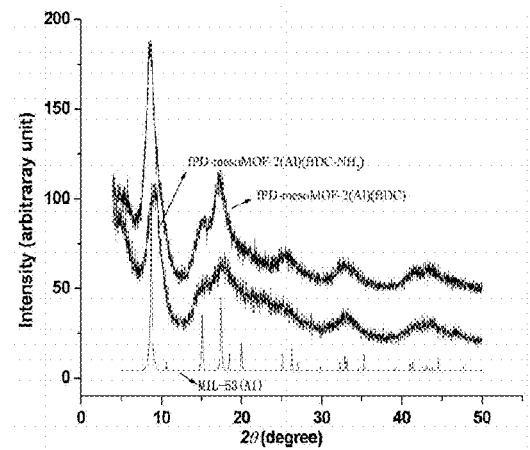
FIG. 6 shows an X-ray powder pattern of IPD-mesoMOF-2(Al)
Figure 7:
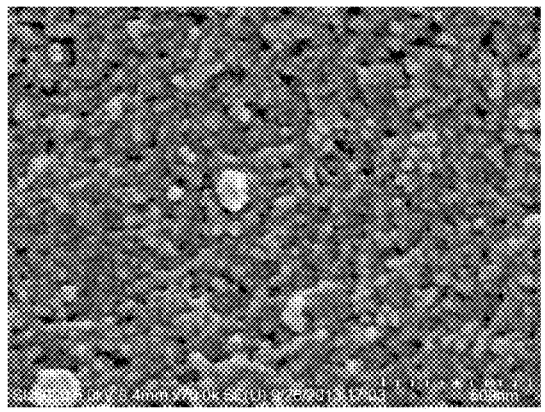
FIG. 7 shows a scanning electron microscopy (SEM) image of IPD-mesoMOF-2A.
Figure 8:
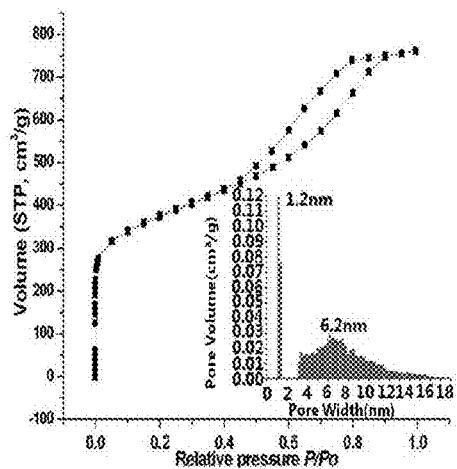
FIG. 8 shows a nitrogen adsorption isotherms and pore size distribution of IPD-mesoMOF-2A (Al)
Figure 9:
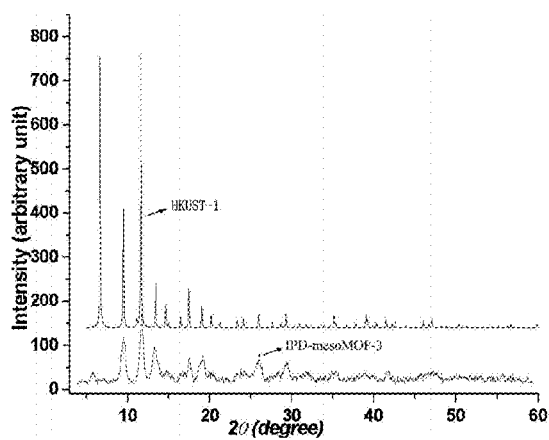
FIG. 9 shows an X-ray powder pattern of IPD-mesoMOF-3.
Figure 10:
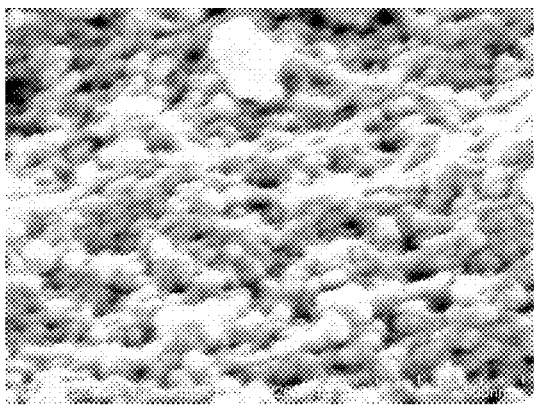
FIG. 10 shows a scanning electron microscopy (SEM) image of IPD-mesoMOF-3A.
Figure 11:
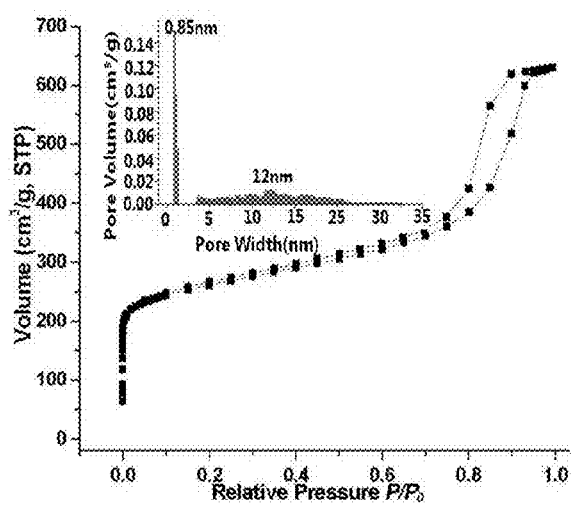
FIG. 11 shows a nitrogen adsorption isotherms and pore size distribution of IPD-mesoMOF-3A.
Figure 12:
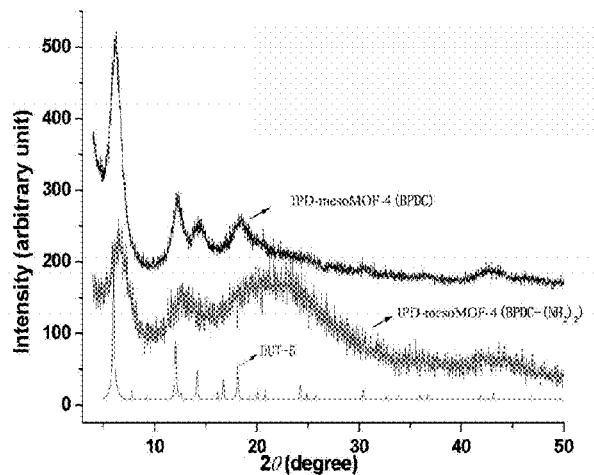
FIG. 12 shows an X-ray powder pattern of IPD-mesoMOF-4.
Figure 13:
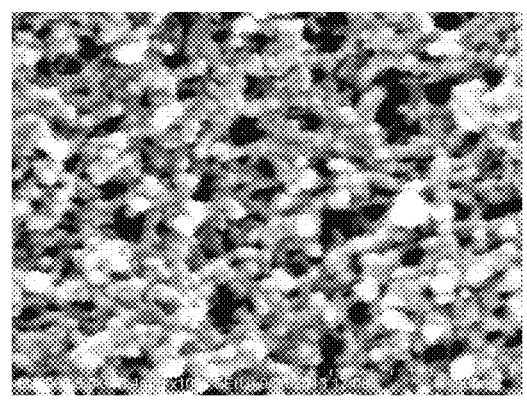
FIG. 13 shows a scanning electron microscopy (SEM) image of IPD-mesoMOF-4A.
Figure 14:
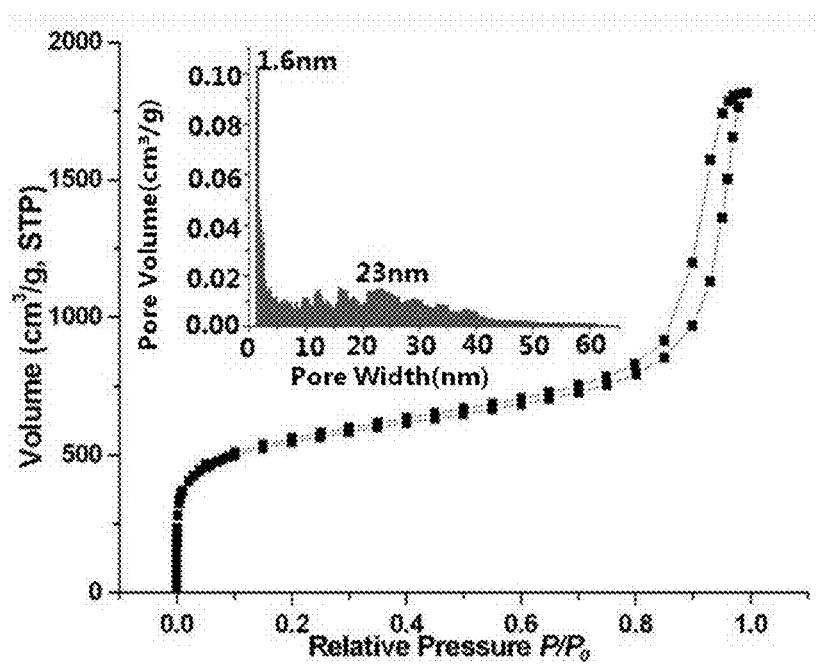
FIG. 14 shows a nitrogen adsorption isotherms and pore size distribution of IPD-mesoMOF-4A.
Figure 15:
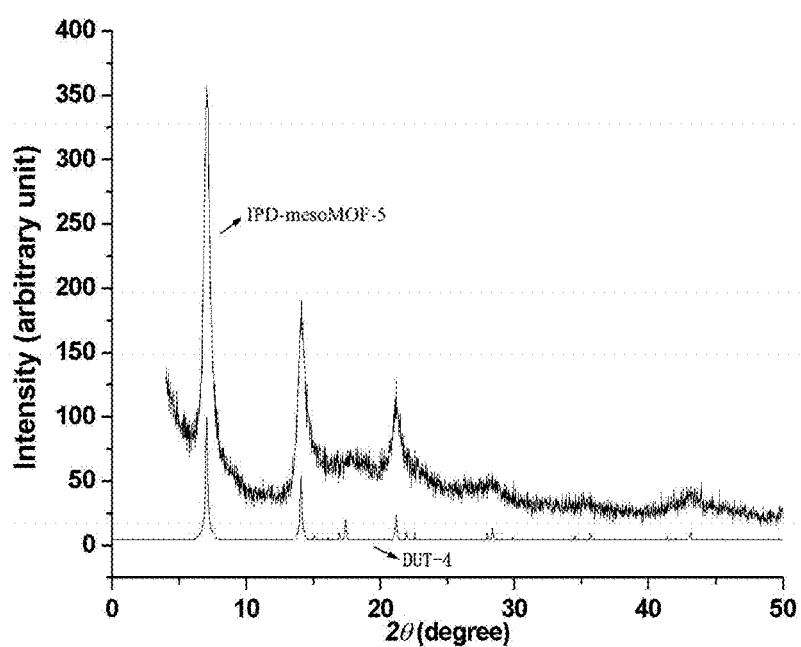
FIG. 15 shows an X-ray powder pattern of IPD-mesoMOF-5.
Figure 16:
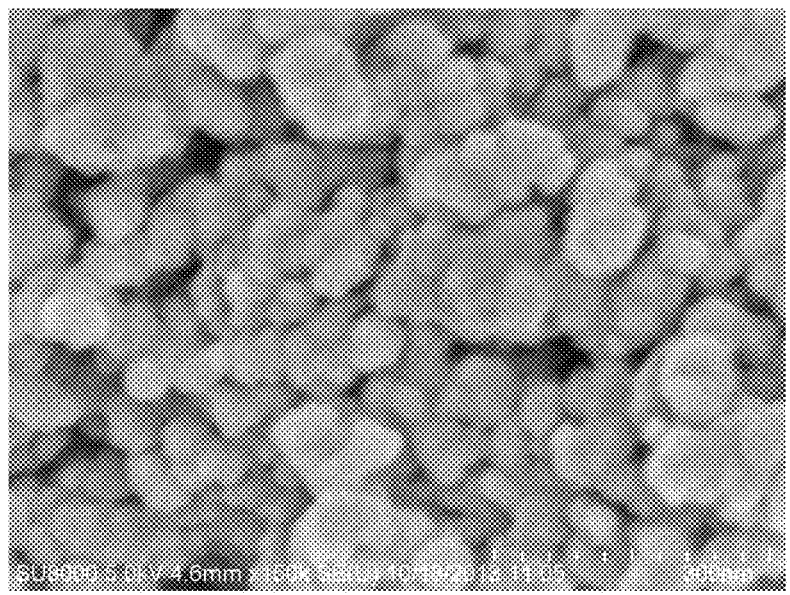
FIG. 16 shows a scanning electron microscopy (SEM) image of IPD-mesoMOF-5A.
Figure 17:
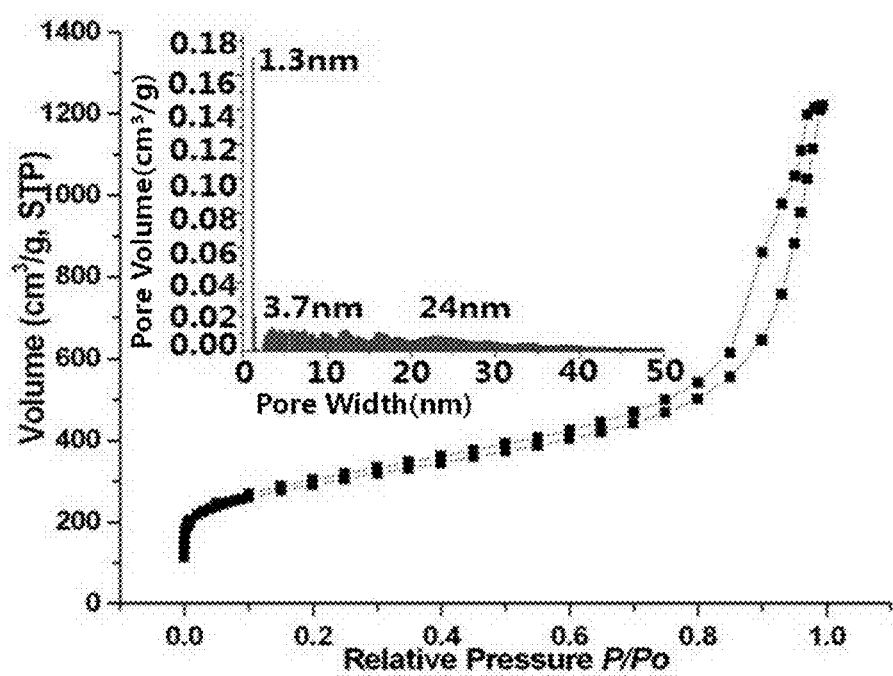
FIG. 17 shows a nitrogen adsorption isotherms and pore size distribution of IPD-mesoMOF-5A.
Figure 18:
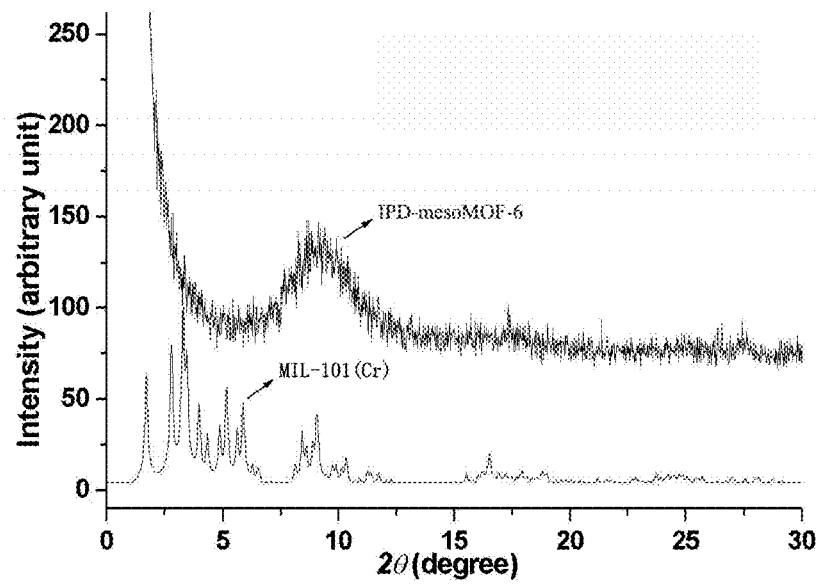
FIG. 18 shows an X-ray powder pattern of IPD-mesoMOF-6.
Figure 19:
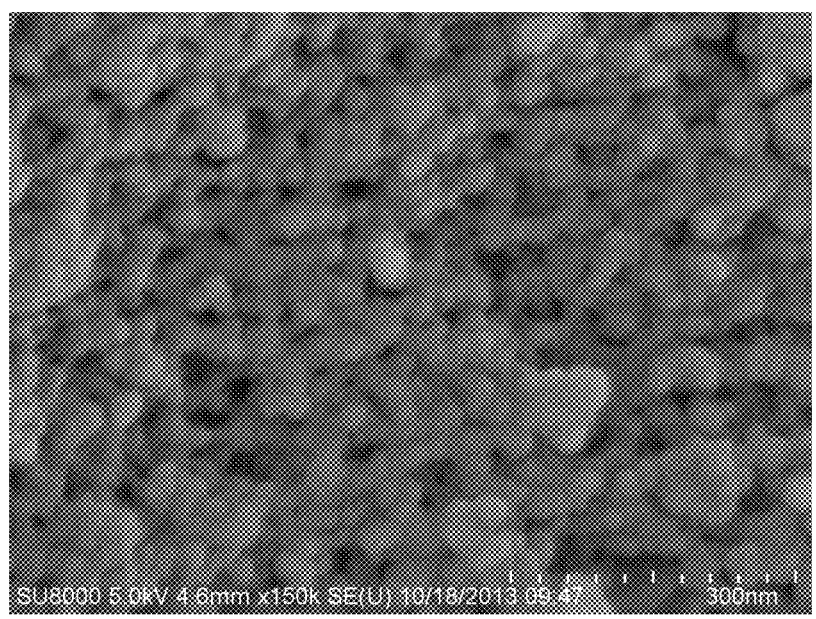
FIG. 19 shows a scanning electron microscopy (SEM) image of IPD-mesoMOF-6A.
Figure 20:
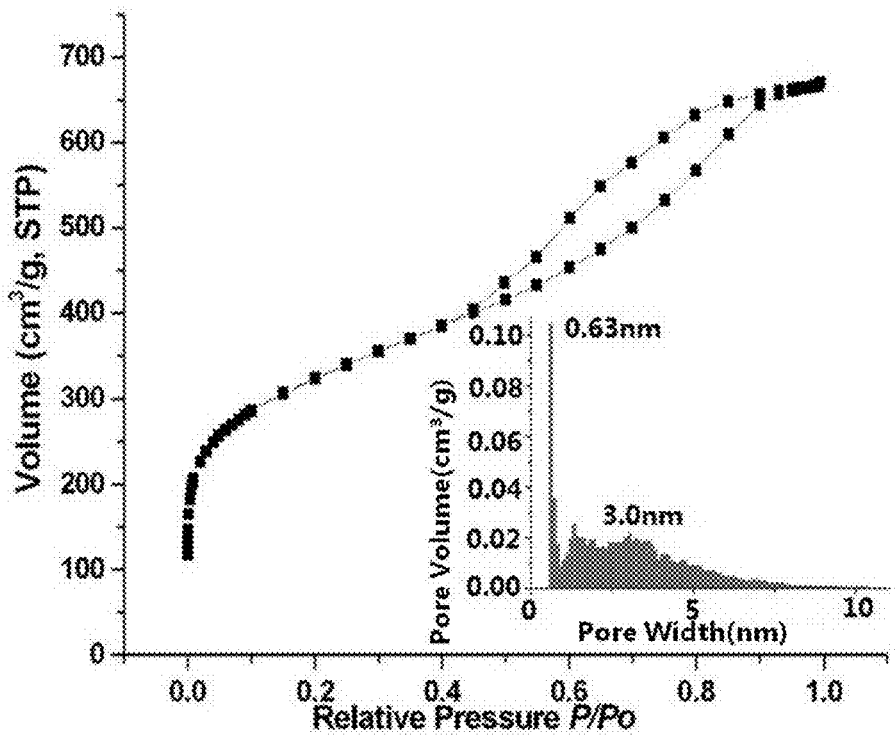
FIG. 20 shows a nitrogen adsorption isotherms and pore size distribution of IPD-mesoMOF-6A.
Figure 21:
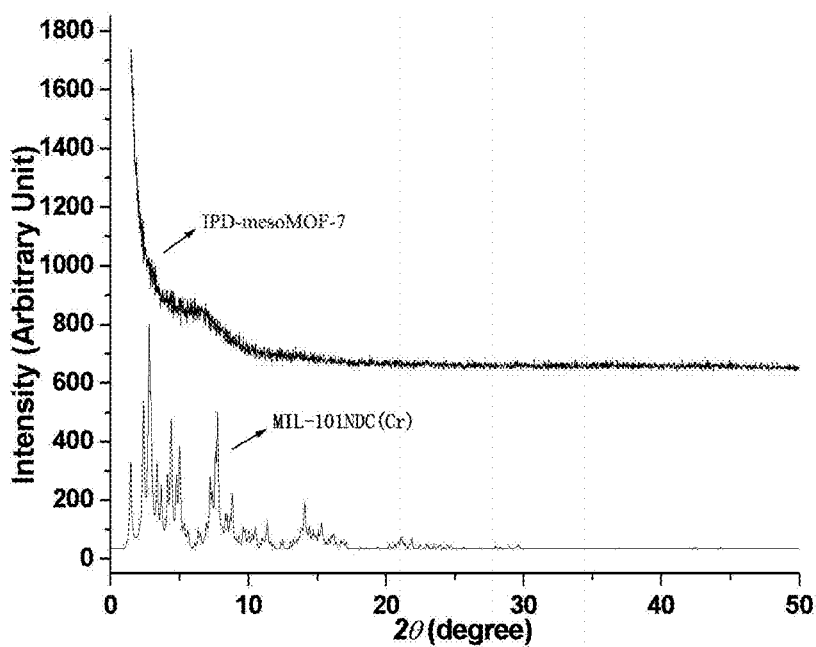
FIG. 21 shows an X-ray powder pattern of IPD-mesoMOF-7.
Figure 22:
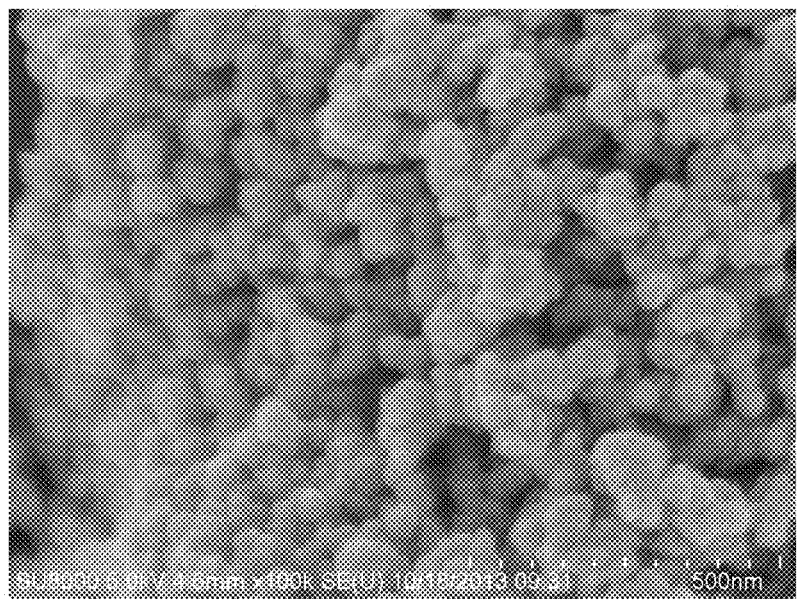
FIG. 22 shows a scanning electron microscopy (SEM) image of IPD-mesoMOF-7A.
Figure 23:
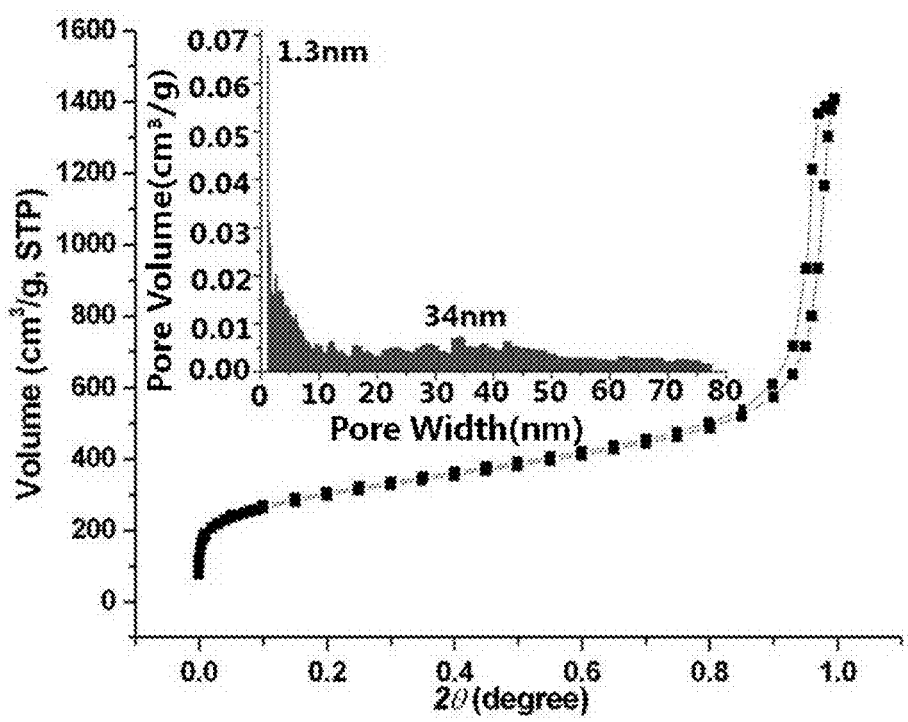
FIG. 23 shows a nitrogen adsorption isotherms and pore size distribution of IPD-mesoMOF-7A.
Figure 24:
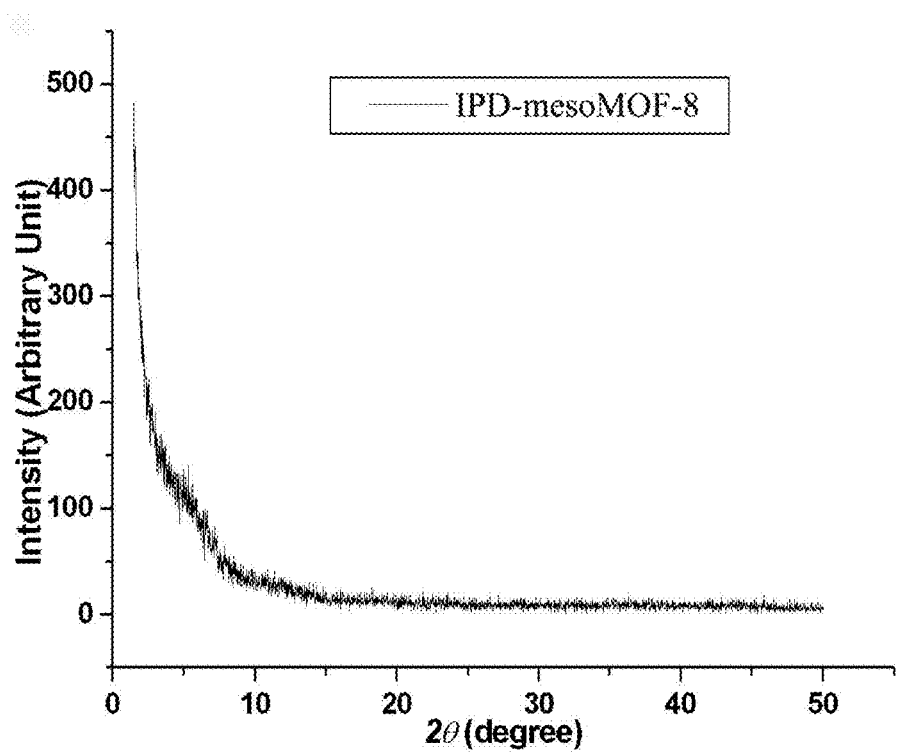
FIG. 24 shows an X-ray powder pattern of IPD-mesoMOF-8.
Figure 25:
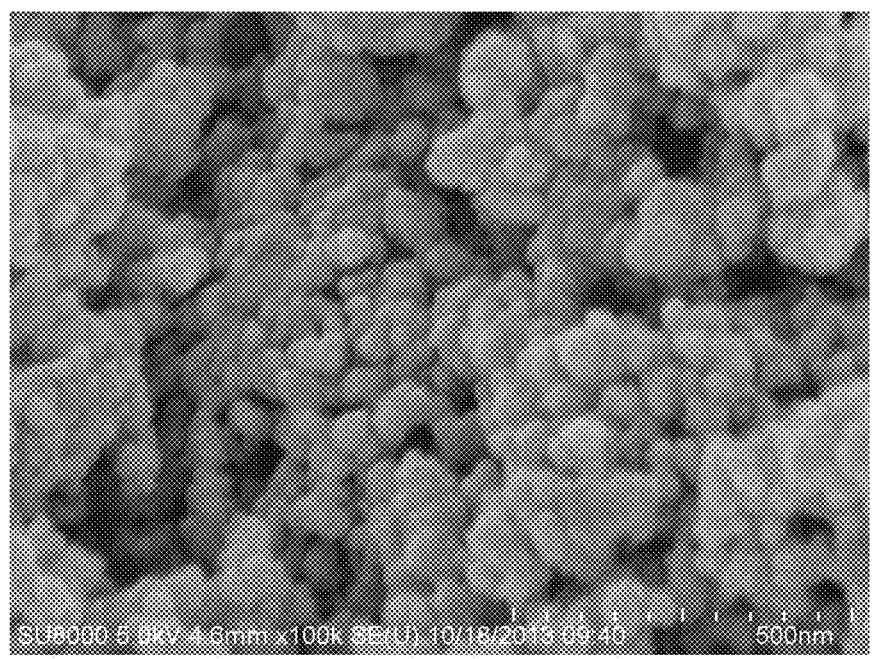
FIG. 25 shows a scanning electron microscopy (SEM) image of IPD-mesoMOF-8A.
Figure 26:
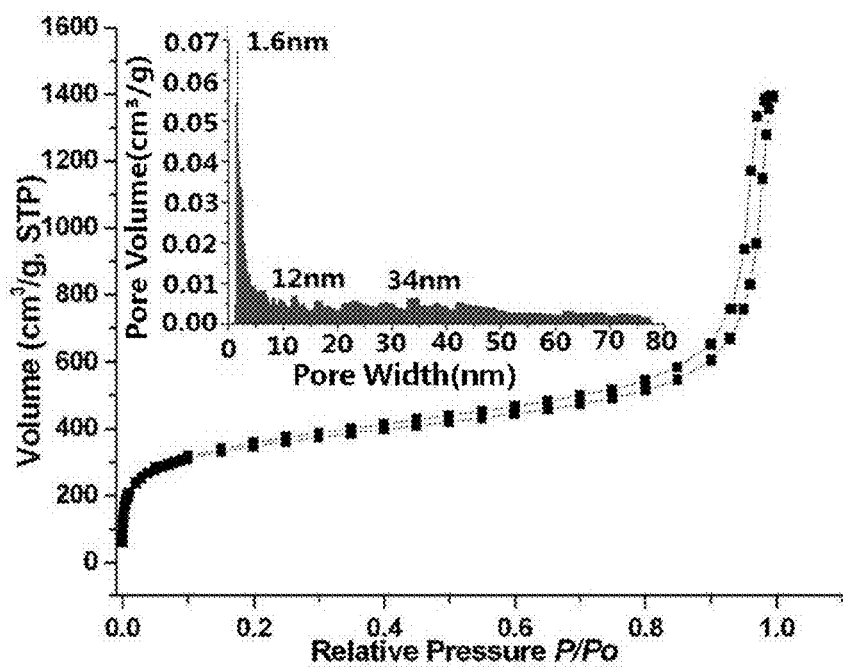
FIG. 26 shows a nitrogen adsorption isotherms and pore size distribution of IPD-mesoMOF-8A.
Figure 27:
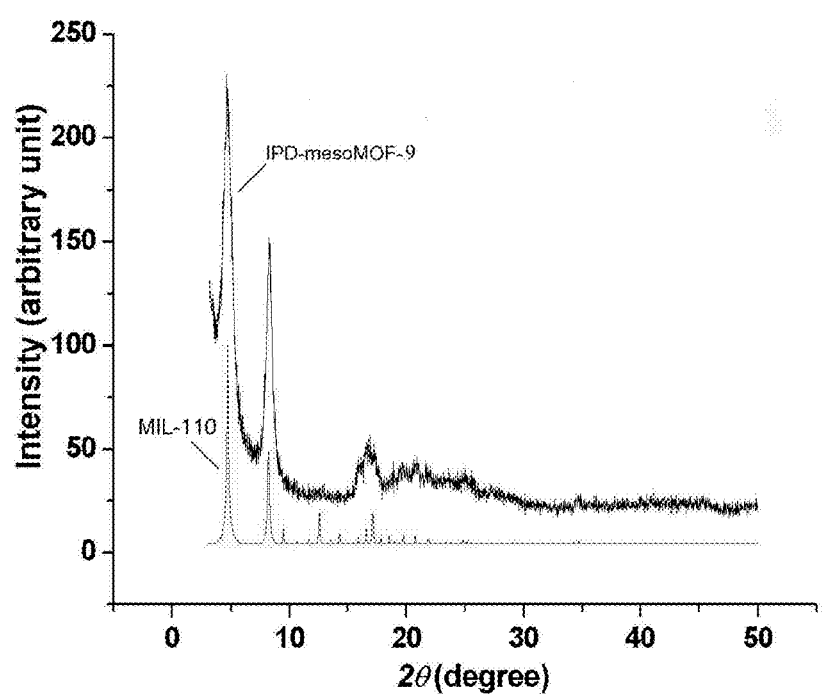
FIG. 27 shows an X-ray powder pattern of IPD-mesoMOF-9.
Figure 28:
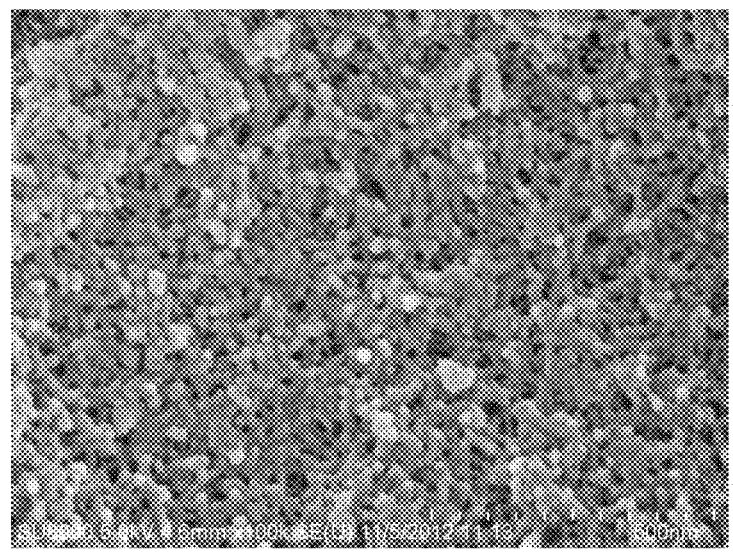
FIG. 28 shows a scanning electron microscopy (SEM) image of IPD-mesoMOF-9A.
Figure 29:
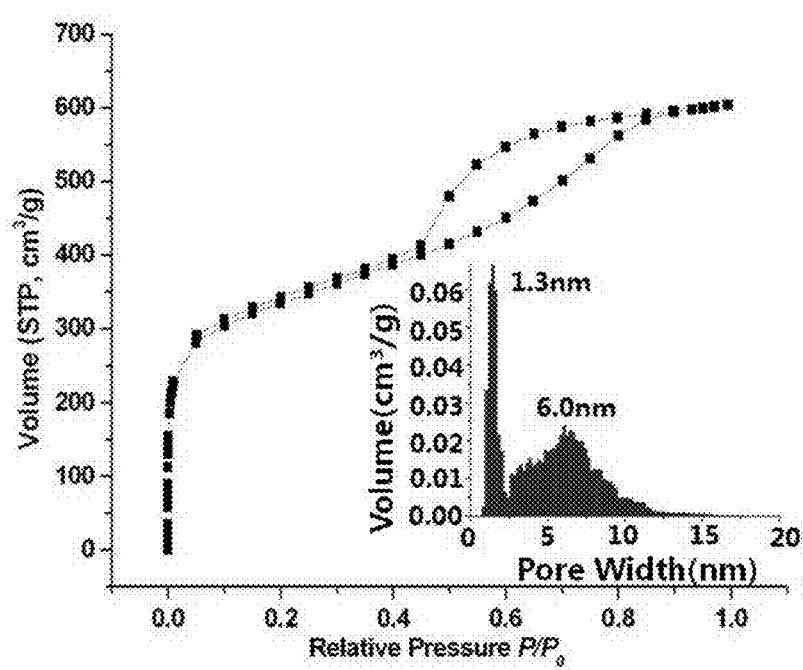
FIG. 29 shows a nitrogen adsorption isotherms and pore size distribution of IPD-mesoMOF-9A.
Figure 30:
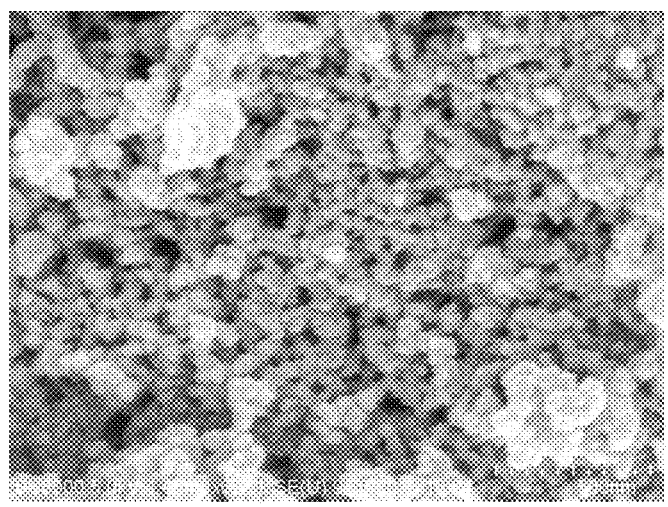
FIG. 30 shows a scanning electron microscopy (SEM) image of IPD-mesoMOF-9B.
Figure 31:
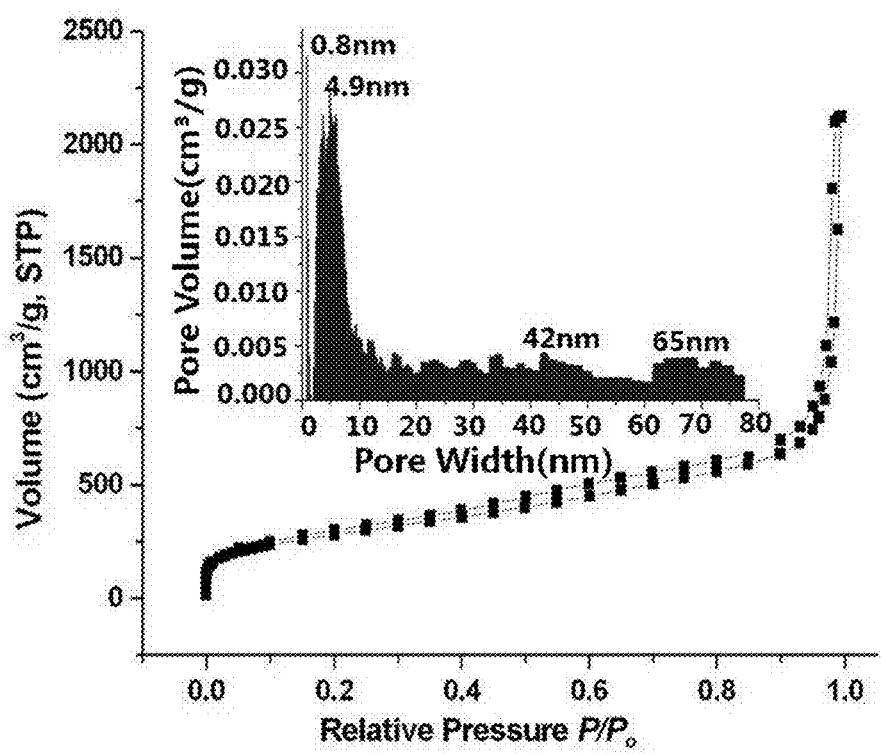
FIG. 31 shows a nitrogen adsorption isotherms and pore size distribution of IPD-mesoMOF-9B.

Referring to FIGS. 1 to 31, the invention is described in detail in connection with the following examples, which are not construed as limiting the scope of the invention.

Raw Materials

All chemical reagents are commercially available products.

EXAMPLES

Preparation method of the series of MOF-based hierarchical porous material IPD-mesoMOF-1~9 of the invention comprises the steps as follows:

(1) Providing Reaction Mass:

(a) For IPD-mesoMOF-1 (based on MOF of MIL-100(M), M=$Al^{3+}$, $Fe^{3+}$, $Cr^{3+}$, $Sc^{3+}$ and $In^{3+}$)

the metal salt is nitrate ($NO_3^-$), sulfate ($SO_4^{2-}$) or perchlorate ($ClO_4^-$) when the metal M=$Al^{3+}$ or $In^{3+}$;

the metal salt is nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) or formate ($HCOO^-$) when the metal M=$Fe^{3+}$, $Sc^{3+}$ or $Cr^{3+}$;

benzene-1,3,5-tricarboxylic acid (BTC) as the ligand; and a solvent; the molar ratio of each component is as follows: $M^{3+}$: benzene-1,3,5-tricarboxylic acid (BTC): solvent=2:1:200-500;

(b) For IPD-mesoMOF-2 (based on MOF of MIL-53(Al))

aluminum nitrate ($NO_3^-$), aluminum sulfate ($SO_4^{2-}$) or aluminum perchlorate ($ClO_4^-$); 1,4-p-phthalic acid (BDC) or 2-X-substituted 1,4-p-phthalic acid (X-BDC) (X=F, Cl, Br, I, $NO_2$, or $NH_2$) as the organic ligand; and a solvent; the molar ratio of each component is as follows: $Al^{3+}$:BDC (or X-BDC):solvent=1.2:1:400-800;

(c) For IPD-mesoMOF-3 (based on MOF of HKUST-1)

copper acetate, copper formate or copper propionate; benzene-1,3,5-tricarboxylic acid (BTC) as the ligand; and a solvent; the molar ratio of each component is as follows: $Cu^{2+}$: benzene-1,3,5-tricarboxylic acid (BTC):solvent=2:1:200-500;

(d) For IPD-mesoMOF-4 (based on MOF of DUT-5)

aluminum nitrate ($NO_3^-$), aluminum sulfate ($SO_4^{2-}$), or aluminum perchlorate ($ClO_4^-$); 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) or 2,2'-diamino-4,4'-biphenyldicarboxylic acid (DABPDC) as the organic ligand; and a solvent; the molar ratio of each component is as follows: $Al^{3+}$:BPDC (NBPDC, ABPDC, DNBPDC or DABPDC):solvent=1.4:1:800-1400;

(e) For IPD-mesoMOF-5 (based on MOF of DUT-4)

aluminum nitrate ($NO_3^-$), aluminum sulfate ($SO_4^{2-}$) or aluminum perchlorate ($ClO_4^-$); 2,6-naphthalenedicarboxylic acid (NDC) as the organic ligand; and a solvent; the molar ratio of each component is as follows: $Al^{3+}$:2,6-naphthalenedicarboxylic acid (NDC):solvent=1.4:1:800-1400;

(f) For IPD-mesoMOF-6 (based on MOF of MIL-101 (Cr))

trivalent Cr nitrate ($NO_3^-$), trivalent Cr sulfate ($SO_4^{2-}$), trivalent Cr perchlorate ($ClO_4^-$), trivalent Cr hydrochloride ($Cl^-$), trivalent Cr hydrobromide ($Br^-$), trivalent Cr acetate ($CH_3COO^-$) or trivalent Cr formate ($HCOO^-$); 1,4-p-phthalic acid (BDC) or 2-X-substituted 1,4-p-phthalic acid (X-BDC) (X=F, Cl, Br, I, $NO_2$ or $NH_2$) as the organic ligand; and a solvent; the molar ratio of each component is as follows: $Cr^{3+}$:1,4-p-phthalic acid (BDC):solvent=1.2:1:800-1400;

(g) For IPD-mesoMOF-7 (based on MOF of MIL-101 NDC(Cr))

trivalent Cr nitrate ($NO_3^-$), trivalent Cr sulfate ($SO_4^{2-}$), trivalent Cr perchlorate ($ClO_4^-$), trivalent Cr hydrochloride ($Cl^-$), trivalent Cr hydrobromide ($Br^-$), trivalent Cr acetate ($CH_3COO^-$) or trivalent Cr formate ($HCOO^-$); 2,6-naphthalenedicarboxylic acid (NDC) as the organic ligand; and a solvent; the molar ratio of each component is as follows: $Cr^{3+}$:2,6-naphthalenedicarboxylic acid (NDC):solvent=1.2:1:800-1400;

(h) For IPD-mesoMOF-8 (based on MOF having MIL-101 topological structure formed from Cr(III) and BPDC)

trivalent Cr nitrate ($NO_3^-$), trivalent Cr sulfate ($SO_4^{2-}$), trivalent Cr perchlorate ($ClO_4^-$), trivalent Cr hydrochloride ($Cl^-$), trivalent Cr hydrobromide ($Br^-$), trivalent Cr acetate ($CH_3COO^-$) or trivalent Cr formate ($HCOO^-$); 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) or 2,2'-diamino-4,4'-biphenyldicarboxylic acid (DABPDC) as the organic ligand; and a solvent; the molar ratio of each component is as follows: $Cr^{3+}$:BPDC (NBPDC, ABPDC, DNBPDC or DABPDC):solvent=1.1:1:1000-2000; and (i) For IPD-mesoMOF-9 (based on MOF of MIL-110)

aluminum nitrate ($NO_3^-$), aluminum sulfate ($SO_4^{2-}$) or aluminum perchlorate ($ClO_4^-$); benzene-1,3,5-tricarboxylic acid (BTC) as the ligand; and a solvent; the molar ratio of each component is as follows: $Al^{3+}$:benzene-1,3,5-tricarboxylic acid (BTC) ligand:solvent=3:1:120-300;

(2) Reaction Solvent:

The solvent is a fatty alcohol of less than 5 carbon atoms or a mixed solvent; the mixed solvent is a fatty alcohol in combination with N,N-dimethylformamide (DMF) or mixtures of two or more fatty alcohols, with the ratio of each component being adjusted if desired;

(3) Reaction Conditions:

The MOF hierarchical porous materials (except IPD-mesoMOF-3) are synthesized by solvothermal or microwave synthesis method. The reaction temperatures are as follows:

For IPD-mesoMOF-1(Al, Fe, Cr, Sc and In): 90-100° C., solvothermal treatment for 10-24 hr, or microwave heating for 3-5 min;

For IPD-mesoMOF-1(Cr): 130-160° C., solvothermal treatment for 4-5 hr, or microwave heating for 2-3 min;

For IPD-mesoMOF-2: 90-120° C., solvothermal treatment for 14-24 hr, or microwave heating for 8-12 min;

For IPD-mesoMOF-3: room temperature 20-35° C., ultrasonic radiation for 0.5-2 hr;

For IPD-mesoMOF-4: 110-130° C., solvothermal treatment for 18-28 hr, or microwave heating for 8-12 min;

For IPD-mesoMOF-5: 110-130° C., solvothermal treatment for 18-28 hr, or microwave heating for 8-12 min;

For IPD-mesoMOF-6: 130-160° C., solvothermal treatment for 3-5 hr, or microwave heating for 3-5 min;

For IPD-mesoMOF-7: 130-160° C., solvothermal treatment for 3-5 hr, or microwave heating for 3-5 min;

For IPD-mesoMOF-8: 130-160° C., solvothermal treatment for 3-5 hr, or microwave heating for 3-5 min;

For IPD-mesoMOF-9: 90-120° C., solvothermal treatment for 14-24 hr, or microwave heating for 8-12 min;

The nano-MOF-based hierarchical porous materials of the present invention, namely IPD-mesoMOF-1~9, are based on MOF of MIL-100(Al, Fe, Cr, Sc and In), MIL-53(Al), HKUST-1, DUT-5, DUT-4, MIL-101(Cr), MIL-101NDC (Cr), MIL-101BPDC(Cr) and MIL-110. Particle size of the nano-MOF particles of the nano-MOF-based hierarchical porous material is less than 120 nm. The hierarchical pores are comprised of micropores and mesopores, forming MOF-based hierarchical porous material-nA (n=1-9); or comprised of micropores, mesopores and macropores, forming MOF-based hierarchical porous material-nB (n=1-9).

Example 1

Preparation Method of Hierarchical Porous Material IPD-mesoMOF-1

(i) Preparation Method of IPD-mesoMOF-1A:

A salt of metal ($Al^{3+}$, $Fe^{3+}$, $Cr^{3+}$, $Sc^{3+}$ or $In^{3+}$), BTC, and a fatty alcohol as described above (or mixed with one or more other specified solvents) are mixed at a molar ratio of $M^{3+}$:benzene-1,3,5-tricarboxylic acid (BTC):solvent=3:2:400-500.

After being uniformly mixed at room temperature, the mixture is transferred to a stainless steel Teflon-lined autoclave under closed conditions. The reaction temperature and time are depended on the metal used (it is also true for microwave heating synthesis). The reaction is cooled to room temperature upon completion of the reaction. Majority of the solvent is removed through filtration or centrifugation. The remaining gelatinous material is dried into xerogel at room temperature (or 50° C. under vacuum), then extracted and washed with anhydrous ethanol or methanol in Soxhlet extractor for 6 hr or more. Residual ethanol is removed at 150° C. under vacuum (0.2 mmHg) to obtain the desired hierarchical porous material IPD-mesoMOF-1A. Yield: about 95-98% (based on BTC).

(ii) Preparation Method of IPD-mesoMOF-1B:

The solvent used in the preparation of IPD-mesoMOF-1A is replaced with a mixed solvent of anhydrous aliphatic alcohols, then mixed with suitable amount of NaCl nanoparticles (particle size of 50-500 nm) (the numbers of mole of NaCl/the numbers of mole of metal ion in MOF <10) according to the requirements for different macropores, and dispersed evenly using ultrasonic heating. The remaining steps are the same as those for IPD-mesoMOF-1A. The xerogel obtained is washed with deionized water to remove NaCl, and then extracted in Soxhlet extractor with ethanol. Yield: about 95% (based on BTC).

Preparation method of hierarchical porous material IPD-mesoMOF-1A(Al) is illustrated in detail as follows:

0.462 g (1.2 mmol) of $Al(NO_3)_3 \cdot 9H_2O$ and 0.168 g (0.8 mmol) of BTC are dissolved in 15 mL of anhydrous ethanol and stirred at room temperature for half hour, transferred into a 30-mL Teflon-lined autoclave and heated at 100° C. for 12 hr. After cooling to room temperature, the gelatinous material obtained is dried at room temperature to form xerogel, which is then extracted and washed with ethanol in Soxhlet extractor and dried at 150° C. under vacuum (0.2 mmHg) for 12 hr. Yield: above 96% (based on the BTC ligand used). (FIG. 3, X-ray powder pattern). Particle size of MIL-100(Al) nanoparticles is about 30 nm (FIG. 4, SEM) with micropores (0.8 nm) and mesoporoes (6.4 nm), BET specific surface area of 1684 m$^2$/g, pore volume of 1.9 cm$^3$/g (FIG. 5, $N_2$ gas adsorption isotherms and pore size distribution).

Preparation method of IPD-mesoMOF-1B(Al) is illustrated in detail as follows:

0.3376 g (0.9 mmol) of $Al(NO_3)_3 \cdot 9H_2O$ and 0.126 g (0.6 mmol) of BTC are dissolved in 13 mL of anhydrous ethanol, stirred at room temperature for half hour, then mixed with 0.293 g (5 mmol) of sodium chloride nanoparticles (particle size of 500 nm), and ultrasonic heated and mixed evenly. Then the mixture is quickly transferred to a 30-mL Teflon-lined stainless autoclave and reacted at 100° C. for 12 hr. After cooling to room temperature, the gelatinous material obtained is dried at room temperature, washed with deionized water to remove NaCl and then washed and dried with anhydrous ethanol, resulting IPD-mesoMOF-1B(Al) with a yield of about 94%.

Example 2

Preparation Method of Hierarchical Porous Material IPD-mesoMOF-2

(i) Preparation Method of IPD-mesoMOF-2A:

An aluminum salt (nitrate, sulfate or perchlorate), terephthalic acid (BDC) or 2-X-substituted terephthalic acid (X-BDC) and a fatty alcohol mentioned above (or mixed with one or more other specified solvent) are mixed at a molar ratio of $Al^{3+}$:(BDC or X-BDC):solvent=1.1:1:400-500 and stirred evenly. Then the mixture is transferred to a Teflon-lined stainless steel autoclave to react under airtight condition at 100-120° C. for 14-24 hr (or microwave heated for 8-12 min). The reaction is cooled to room temperature upon completion of the reaction. Majority of the solvent is removed through filtration or centrifugation. A waxy material is dried to form xerogel at room temperature (or 50° C. under vacuum), then extracted and washed with anhydrous ethanol or methanol in Soxhlet extractor for over 6 hr. The resultant is heated at 150° C. under vacuum (0.2 mmHg) for 12 hr to remove residual ethanol to obtain the desired hierarchical porous material IPD-mesoMOF-2A with a yield of 96-98% (based on BDC).

(ii) Preparation Method of IPD-mesoMOF-2B: similar to that of IPD-mesoMOF-1B.

Preparation method of IPD-mesoMOF-2A is illustrated in detail as follows:

0.41 g (1.1 mmol) of $Al(NO_3)_3 \cdot 9H_2O$ and 0.17 g (1.0 mmol) of BDC are added to 15 mL of anhydrous ethanol, stirred and dissolved at room temperature, then transferred to a 30-mL Teflon-lined autoclave and kept at 120° C. to react for 24 hr. After cooling to room temperature, the gelatinous material is dried to form xerogel at room temperature (or 50° C. under vacuum), then extracted and washed with anhydrous ethanol or methanol in Soxhlet extractor for over 6 hr. The resultant is heated at 150° C. under vacuum (0.2 mmHg) to remove residual ethanol to obtain hierarchical porous material IPD-mesoMOF-2A with a yield of about 95%-98% (based on BDC). Particle size of MIL-53(Al) nanoparticles constituting IPD-mesoMOF-2A (FIG. 6, X-ray powder pattern) is about 40 nm (FIG. 7, SEM) with BET specific surface area of 1340 m$^2$/g, pore volume of 1.2 cm$^3$/g (FIG. 8, $N_2$ gas adsorption isotherms and pore size distribution), micropores (1.2 nm) and mesopores (6.2 nm).

Example 3

Preparation Method of Hierarchical Porous Material IPD-mesoMOF-3

(i) Preparation Method of IPD-mesoMOF-3A:

Copper acetate, copper formate or copper propinoate, BTC and methanol (or ethanol, or a mixed solvent) are mixed at a molar ratio of $Cu^{2+}$:benzene-1,3,5-tricarboxylic acid (BTC):solvent=3:2:400-500, and ultrasonically heated to react at room temperature (20-30° C.) for 40-120 min. After the reaction is completed and majority of the solvent is removed through centrifugation, the paste-like material is dried in air at room temperature (or 50° C. under vacuum) to form xerogel. The xerogel is further dried at 130° C. under vacuum for more than 6 hr. The above-mentioned xerogel is extracted and washed with anhydrous ethanol or methanol in Soxhlet extractor for over 6 hr, then heated at 150° C. under vacuum (0.2 mmHg) for more than 12 hr to remove residual ethanol to obtain the desired hierarchical porous material IPD-mesoMOF-3A with a yield of about 95-98% (based on BTC).

(ii) Preparation Method of IPD-mesoMOF-3B: Similar with that of IPD-mesoMOF-1B.

Preparation method of IPD-mesoMOF-3A is illustrated in detail as follows:

0.18 g (0.9 mmol) of $Al(NO_3)_3 \cdot 9H_2O$, 0.13 g (0.6 mmol) of BTC and 0.38 g (1.2 mmol) of tetrabutylammonium bromide are dissolved in 15 mL of anhydrous ethanol and allowed to react under ultrasonic heating at room temperature (28° C.) for 40 min. The paste-like product obtained stands at room temperature for 24 hr to form xerogel. The xerogel is further dried at 130° C. under vacuum (0.1 mmHg), and then extracted and washed with anhydrous ethanol or methanol in Soxhlet extractor for over 6 hr. Then, the pure xerogel is heated again at 150° C. under vacuum (0.2 mmHg) for 12 hr to remove residual ethanol to obtain the hierarchical porous material IPD-mesoMOF-3A with a yield of about 94-97% (based on BDC). Particle size of HKUST-1 nanoparticles constituting IPD-mesoMOF-3A (FIG. 9, X-ray powder pattern) is about 20 nm (FIG. 10, SEM), with micropores (0.85 nm) and mesopores (12 nm), BET specific surface area of 971 $m^2/g$ and pore volume of 0.98 $cm^3/g$ (FIG. 11, $N_2$ gas adsorption isotherms and pore size distribution).

Example 4

Preparation Method of Hierarchical Porous Material IPD-mesoMOF-4

(i) Preparation Method of IPD-mesoMOF-4A:

An aluminum salt (nitrate, sulfate or perchlorate), 4,4'-biphenyldicarboxylic acid (BPDC) (or 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC)) and 2,2'-diamino-4,4'-biphenyldicarboxylic acid (DABPDC)) and ethanol (or mixed with one or more other specified solvent) are mixed at a molar ratio of $Al^{3+}$:BPDC (or NBPDC, ABPDC, DNBPDC and DABPDC):solvent=1.4:1:800-1000 and stirred. Then the mixture is transferred to a Teflon-lined stainless steel autoclave to react under airtight conditions at 110-120° C. for 18-28 hr (or microwave heated for 8-12 min). Upon completion of the reaction, then the reaction is cooled to room temperature. Majority of the solvent is removed through filtration or centrifugation. The paste-like material is dried at room temperature (or 50° C. under vacuum) to form xerogel, then extracted and washed with anhydrous ethanol or methanol in Soxhlet extractor for over 6 hr. The resultant is heated at 150° C. under vacuum (0.2 mmHg) for 12 hr to remove residual ethanol to obtain the desired hierarchical porous material IPD-mesoMOF-4A with a yield of about 97-98% (based on organic ligand).

(ii) IPD-mesoMOF-4B: The Method is Similar to that of IPD-mesoMOF-1B.

Preparation method of IPD-mesoMOF-4A is illustrated in detail as follows:

0.28 g (0.75 mmol) of $Al(NO_3)_3.9H_2O$, 0.11 g (0.54 mmol) of BPDC and 0.69 g (2.14 mmol) of tetrabutylammonium bromide and 15 mL anhydrous ethanol are mixed and stirred evenly at room temperature in a 30-mL Teflon autoclave and then sealed to react at 120° C. for 24 hr. After cooled to room temperature, the paste-like material is dried to xerogel at room temperature (or 50° C. under vacuum), then extracted and washed with anhydrous ethanol or methanol in Soxhlet extractor for over 6 hr. The resultant is heated at 150° C. under vacuum (0.2 mmHg) for 12 hr to remove residual ethanol to obtain hierarchical porous material IPD-mesoMOF-4A with a yield of about 95-98% (based on BPDC). Particle size of DUT-5 nanoparticles constituting IPD-mesoMOF-4A (FIG. 12, X-ray powder pattern) is about 20 nm (FIG. 13, SEM) with micropores (1.6 nm) and mesopores (2-50 nm), BET specific surface area of 2026 $m^2/g$ and pore volume of 2.8 $cm^3/g$ (FIG. 14, $N_2$ gas adsorption isotherms and pore size distribution).

Example 5

Preparation Method of Hierarchical Porous IPD-mesoMOF-5

(i) Preparation Method of IPD-mesoMOF-5A:

An aluminum salt (nitrate, sulfate or perchlorate), 2,6-naphthalenedicarboxylic acid (NDC) and ethanol (or mixed with one or more other specified solvent) are mixed at a molar ratio of $Al^{3+}$:NDC:solvent=1.2:1:800-1000 and stirred. And then the mixture is transferred to a Teflon-lined stainless steel autoclave to react under airtight condition at 110-120° C. for 18-28 hr (or microwave heated for 8-12 min). After the reaction is cooled to room temperature upon completion of the reaction, majority of the solvent is removed through filtration or centrifugation. The paste-like material obtained is dried at room temperature (or 50° C. under vacuum) to form xerogel, then extracted and washed with anhydrous ethanol or methanol in Soxhlet extractor for over 6 hr. The resultant is heated at 150° C. under vacuum (0.2 mmHg) to remove residual ethanol to obtain the hierarchical porous material IPD-mesoMOF-5A.

(ii) IPD-mesoMOF-5B: the Method is Similar to that of IPD-mesoMOF-1B.

Preparation method of IPD-mesoMOF-5A is illustrated in detail as follows:

0.25 g (0.6 mmol) of $Al(NO_3)_3.9H_2O$, 0.11 g (0.5 mmol) of NDC and 15 mL of anhydrous ethanol are mixed and stirred in a 30-mL Teflon reactor at room temperature and then sealed to react at 120° C. for 24 hr. After cooled to room temperature, the paste-like material obtained is dried to form xerogel at room temperature (or 50° C. under vacuum), then extracted and washed with anhydrous ethanol or methanol in Soxhlet extractor for over 6 hr. The resultant is heated at 150° C. under vacuum (0.2 mmHg) for 12 hr to remove residual ethanol to obtain the hierarchical porous material IPD-mesoMOF-5A of a yield of about 98% (based on NDC). Particle size of DUT-4 nanoparticles constituting IPD-mesoMOF-5A (FIG. 15, X-ray powder pattern) is about 50 nm (FIG. 16, SEM) with micropores (1.3 nm) and mesopores (2-40 nm), BET specific surface area of 1044 $m^2/g$ and pore volume of 1.9 $cm^3/g$ (FIG. 17, $N_2$ gas adsorption isotherms and pore size distribution).

Example 6

Preparation Method of Hierarchical Material IPD-mesoMOF-6

(i) Preparation Method of IPD-mesoMOF-6A:

Trivalent Cr nitrate ($NO_3^-$), sulfate ($SO_4^{2-}$), perchlorate ($ClO_4$), hydrochloride ($Cl^-$), hydrobromide ($Br^-$), acetate ($CH_3COO^-$) or formate ($HCOO^-$); 1,4-terephthalic acid (BDC) as organic ligand, formic acid (HFc) (or acetic acid HAc), and solvent are mixed at a molar ratio of each component as follows: $Cr^{3+}$:BDC:HFc:solvent=1:1:1:800-1000 and stirred. And then the mixture is transferred to a Teflon-lined stainless steel autoclave to react under airtight conditions at 130-160° C. for 3-5 hr (or microwave heated for 3-5 min). Upon completion of the reaction, the reaction mass was cooled to room temperature. Majority of the solvent is removed through filtration or centrifugation. The paste-like material is dried to form xerogel at room temperature (or 50° C. under vacuum), then extracted and washed with anhydrous ethanol or methanol in Soxhlet extractor for over 6 hr. The resultant is heated at 150° C. under vacuum (0.2 mmHg) for 12 hr to remove residual ethanol to obtain the MOF-based hierarchical porous material-6A with a yield of about 97% (based on BDC).

(ii) IPD-mesoMOF-6B: the Method is Similar to that of IPD-mesoMOF-1B.

Preparation method of IPD-mesoMOF-6A is illustrated in detail as follows:

0.17 g (0.5 mmol) of $Cr(NO_3)_3.6H_2O$, 0.08 g (0.5 mmol) of BDC and 15 mL of anhydrous ethanol are mixed and stirred at room temperature in a 30-mL Teflon autoclave, and then sealed to react at 150° C. for 5 hr. After cooled to room temperature, the sol-like material obtained is dried to form xerogel at room temperature (or 50° C. under vacuum), then extracted and washed with anhydrous ethanol or methanol in Soxhlet extractor for over 6 hr. The resultant is heated at 150° C. under vacuum (0.1 mmHg) for 12 hr to remove residual ethanol to obtain the hierarchical porous material IPD-mesoMOF-6A with a yield of 96% (based on BDC). Particle size of MIL-101(Cr) nanoparticles constituting IPD-mesoMOF-6A (FIG. 18, X-ray powder pattern) is about 30 nm (FIG. 19, SEM) with micropores (1.3 nm) and mesopores (2-7 nm), BET specific surface area of 1169 $m^2/g$ and pore volume of 1.0 $cm^3/g$ (FIG. 20, $N_2$ gas adsorption isotherms and pore size distribution).

Example 7

Preparation Method of Hierarchical Porous Material IPD-mesoMOF-7

(i) Preparation Method of IPD-mesoMOF-7a:

Trivalent Cr nitrate ($NO_3$), sulfate ($SO_4^{2-}$), perchlorate ($ClO_4$), hydrochloride ($Cl^-$), hydrobromide ($BR^-$), acetate ($CH_3COO^-$) or formate ($HCOO^-$), 2,6-naphthalenedicarboxylic acid (NDC) as organic ligand, formic acid (HFc) (or acetic acid HAc) and a solvent are mixed at a molar ratio of each component as follows: $Cr^{3+}$:NDC:HFc:solvent=1:1:1:800-1000 and stirred. And then the mixture is transferred to a Teflon-lined stainless steel autoclave to react under airtight conditions at 130-160° C. for 3-5 hr (or microwave heated 3-5 min). Upon completion of the reaction, the reaction was cooled to room temperature. Majority of the solvent is removed through filtration or centrifugation. The paste-like material obtained is dried to form xerogel at room temperature (or 50° C. under vacuum), then extracted and washed with anhydrous ethanol or methanol in Soxhlet extractor for over 6 hr. The resultant is heated at 150° C. under vacuum (0.1 mmHg) for 12 hr to remove residual ethanol to obtain the hierarchical porous material IPD-mesoMOF-7A.

(ii) IPD-mesoMOF-7B: The Method is Similar to that of IPD-mesoMOF-1B.

Preparation method of IPD-mesoMOF-7A is illustrated in detail as follows:

0.17 g (0.5 mmol) of $Cr(NO_3)_3.6H_2O$, 0.11 g (0.5 mmol) of NDC, and 15 mL of anhydrous ethanol are mixed and stirred at room temperature in a 30-mL Teflon autoclave, and then sealed to react at 120° C. for 24 hr. After cooled to room temperature, the paste-like material obtained is dried to form xerogel at room temperature (or 50° C. under vacuum), then extracted and washed with anhydrous ethanol or methanol in Soxhlet extractor for over 6 hr. The resultant is heated at 150° C. under vacuum (0.1 mmHg) for 12 hr to remove residual ethanol to obtain the hierarchical porous material IPD-mesoMOF-7A with a yield of about 98% (based on NDC). Particle size of MIL-101NDC(Cr) nanoparticles constituting IPD-mesoMOF-7A (FIG. 21, X-ray powder pattern) is about 30 nm (FIG. 22, SEM) with micropores (1.3 nm) and mesopores (280 nm), BET specific surface area of 1078 $m^2/g$ and pore volume of 2.2 $cm^3/g$ (FIG. 23, $N_2$ gas adsorption isotherms and pore size distribution).

Example 8

Preparation Method of Hierarchical Material IPD-mesoMOF-8

(i) Preparation Method of IPD-mesoMOF-8A:

Trivalent Cr nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) or formate ($HCOO^-$); 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) or 2,2'-diamino-4,4'-biphenyldicarboxylic acid (DABPDC) as organic ligand; formic acid (HFc) (or acetic acid HAc), and a solvent are mixed at a molar ratio of each component as follows: $Cr^{3+}$: BPDC (NBPDC, ABPDC, DNBPDC or DABPDC):HFc:solvent=1:1:1:800-1000 and stirred. And then the mixture is transferred to a stainless steel autoclave with Teflon lining to react under airtight conditions at 130-160° C. for 3-5 hr (or microwave heated for 3-5 min). Upon completion of the reaction, the reaction was cooled to room temperature. Majority of the solvent is removed through filtration or centrifugation. The gel-like material is dried under vacuum to form xerogel at room temperature (or 50° C.), then extracted and washed with anhydrous ethanol or methanol in Soxhlet extractor for over 6 hr. The resultant is heated at 150° C. under vacuum (0.1 mmHg) for 12 hr to remove residual ethanol to obtain the hierarchical porous materials IPD-mesoMOF-8A.

(ii) IPD-mesoMOF-8B: the Method is Similar to that of IPD-mesoMOF-1B.

Preparation method of IPD-mesoMOF-8A is illustrated in detail as follows:

0.33 g (0.55 mmol) of $Cr(NO_3)_3.6H_2O$, 0.12 g (0.5 mmol) of BPDC and 28 mL of anhydrous ethanol are mixed and stirred at room temperature in a 30-mL Teflon autoclave, and then sealed to react at 150° C. for 5 hr. After cooled to room temperature, the gelatinous material obtained is then extracted and washed with anhydrous ethanol or methanol in Soxhlet extractor for over 6 hr, and then dried in air to form xerogel. The resultant is heated at 150° C. under vacuum (0.1 mmHg) for 12 hr to remove residual ethanol to obtain the hierarchical porous material IPD-mesoMOF-8A with a yield of about 98% (based on BPDC). Particle size of MIL-101BPDC(Cr) nanoparticles constituting IPD-mesoMOF-8A (FIG. 24, X-ray powder pattern) is about 40 nm (FIG. 25, SEM) with micropores (1.6 nm) and mesopores (280 nm), BET specific surface area of 1267 $m^2/g$ and pore volume of 2.2 $cm^3/g$ (FIG. 26, $N_2$ gas adsorption isotherms and pore size distribution).

While the invention has been described in terms of preferred embodiments, those skilled in the art will recognize that the invention can be practiced with modifications within the spirit and scope of the appended claims.

What is claimed is:

1. A MOF-based hierarchical porous material IPD-mesoMOF-1~9, characterized in that:
    the MOF-based hierarchical porous material is based on the following MOF-type structure: MIL-100(Al, Fe, Cr, Sc and In), MIL-53(Al), HKUST-1, DUT-5, DUT-4, MIL-101(Cr), MIL-101NDC(Cr), MIL-101BPDC(Cr) and MIL-110;
    the MOF-based hierarchical porous material comprises micropores, in which the structural features and pore aperture of the micropores vary with regard to the MOF-type;
    the MOF-based hierarchical porous material is based on MOF nanoparticles with particle size less than 120 nm; and
    the MOF nanoparticles with particle size less than 120 nm are capable of generating the desired interparticle mesopores of 2-50 nm under close or relatively close packing conditions.

2. The MOF-based hierarchical porous material IPD-mesoMOF-1~9 of claim 1, characterized in that:
    the MOF-based hierarchical porous material comprises mesopores which are interparticle porosity generated by close packing of particles;

particle size of the MOF nanoparticles is less than 120 nm, and the interaction between the free metal ion sites and ligand coordination residues on the surface of the nanoparticles enable the stable permanent interparticle porosity formed among the close or relatively close packed particles;

the MOF nanoparticles with diameter of $\phi_m$ are stacked in the form of cubic close packing, and aperture of the octahedral interparticle pores generated by close packing $\phi_s \approx 0.414 \phi_m$, and the interparticle porosity generated from close or relatively close packing of MOF nanoparticles with a size of less than 120 nm falls within the mesoscopic range of 2-50 nm.

3. The MOF-based hierarchical porous material IPD-mesoMOF-1~9 of claim 1, characterized in that:

the MOF-based hierarchical porous material comprises micropores and mesopores, forming A-Form of IPD-mesoMOF-1~9 material; or the MOF-based hierarchical porous material comprises micropores, mesopores and macropores, forming B-Form of IPD-mesoMOF-1~9 material; or the MOF-based hierarchical porous material prepared by supercritical $CO_2$ drying comprises micropores, mesopores and macropores, forming C-Form of IPD-mesoMOF-1~9 material.

4. A preparation method for the MOF-based hierarchical porous material IPD-mesoMOF-1~9 of claim 1, which comprises the steps as follows:

(1) providing reaction mass:

(a) for IPD-mesoMOF-1 (based on MOF of MIL-100(M), M=$Fe^{3+}$, $Al^{3+}$, $Cr^{3+}$, $Sc^{3+}$ and $In^{3+}$)

a metal salt ($M^{3+}$) selected from nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); benzene-1,3,5-tricarboxylic acid (BTC) as ligand; and a solvent; the molar ratio of each component is as follows: $M^{3+}$:benzene-1,3,5-tricarboxylic acid (BTC):solvent=2:1:200-500;

(b) for IPD-mesoMOF-2 (based on MOF of MIL-53(Al))

an aluminum salt selected from nitrate ($NO_3^-$), sulfate ($SO_4^{2-}$) and perchlorate ($ClO_4^-$); 1,4-p-phthalic acid (BDC) or 2-X-substituted 1,4-p-phthalic acid (X-BDC) (X=F, Cl, Br, I, $NO_2$, or $NH_2$) as organic ligand; and a solvent; the molar ratio of each component is as follows: $Al^{3+}$:BDC (or X-BDC):solvent=1.2:1:400-800;

(c) for IPD-mesoMOF-3 (based on MOF of HKUST-1)

copper acetate, copper formate or copper propionate; benzene-1,3,5-tricarboxylic acid (BTC) as ligand; and a solvent; the molar ratio of each component is as follows: $Cu^{2+}$:benzene-1,3,5-tricarboxylic acid (BTC):solvent=2:1:200-500;

(d) for IPD-mesoMOF-4 (based on MOF of DUT-5)

an aluminum salt selected from nitrate ($NO_3^-$), sulfate ($SO_4^{2-}$) and perchlorate ($ClO_4^-$); an organic ligand selected from 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) and 2,2'-diamino-4,4'-biphenyldicarboxylic acid (DABPDC); and a solvent; the molar ratio of each component is as follows: $Al^{3+}$:BPDC (NBPDC, ABPDC, DNBPDC or DABPDC):solvent=1.4:1:800-1400;

(e) for IPD-mesoMOF-5 (based on MOF of DUT-4)

an aluminum salt selected from nitrate ($NO_3^-$), sulfate ($SO_4^{2-}$) and perchlorate ($ClO_4^-$); 2,6-naphthalenedicarboxylic acid (NDC) as organic ligand; and a solvent; the molar ratio of each component is as follows: $Al^{3+}$: 2,6-naphthalenedicarboxylic acid (NDC): solvent=1.4:1:800-1400;

(f) for IPD-mesoMOF-6 (based on MOF of MIL-101 (Cr))

a trivalent Cr salt selected from nitrate ($NO_3^-$), sulfate ($SO_4^{2-}$), perchlorate ($ClO_4$), hydrochloride ($Cl^-$), hydrobromide ($Br^-$), acetate ($CH_3COO^-$) and formate ($HCOO^-$); 1,4-p-phthalic acid (BDC) or 2-X-substituted 1,4-p-phthalic acid (X-BDC) (X=F, Cl, Br, I, $NO_2$, or $NH_2$) as organic ligand; and a solvent; the molar ratio of each component is as follows: $Cr^{3+}$:1,4-p-phthalic acid (BDC):solvent=1.2:1:800-1400;

(g) for IPD-mesoMOF-7 (based on MOF of MIL-101 NDC (Cr))

a trivalent Cr salt selected from nitrate ($NO_3^-$), sulfate ($SO_4^{2-}$), perchlorate ($ClO_4$), hydrochloride ($Cl^-$), hydrobromide ($Br^-$), acetate ($CH_3COO^-$) and formate ($HCOO^-$); 2,6-naphthalenedicarboxylic acid (NDC) as organic ligand; and a solvent; the molar ratio of each component is as follows: $Cr^{3+}$: 2,6-naphthalenedicarboxylic acid (NDC): solvent=1.2:1:800-1400;

(h) for IPD-mesoMOF-8 (based on MOF having MIL-101 topological structure formed by Cr(III) and BPDC)

a trivalent Cr salt selected from the group consisted of nitrate ($NO_3^-$), sulfate ($SO_4^{2-}$), perchlorate ($ClO_4^-$), hydrochloride ($Cl^-$), hydrobromide ($Br^-$), acetate ($CH_3COO^-$) and formate ($HCOO^-$); an organic ligand selected from 4,4'-biphenyldicarboxylic acid (BPDC), 2-nitro-4,4'-biphenyldicarboxylic acid (NBPDC), 2-amino-4,4'-biphenyldicarboxylic acid (ABPDC), 2,2'-dinitro-4,4'-biphenyldicarboxylic acid (DNBPDC) and 2,2'-diamino-4,4'-biphenyldicarboxylic acid (DABPDC); and a solvent, the molar ratio of each component is as follows: $Cr^{3+}$:BPDC (NBPDC, ABPDC, DNBPDC or DABPDC):solvent=1.1:1:1000-2000; and (i) IPD-mesoMOF-9((based on MOF of MIL-110)

aluminum nitrate ($NO_3^-$), aluminum sulfate ($SO_4^{2-}$) or aluminum perchlorate ($ClO_4^-$); benzene-1,3,5-tricarboxylic acid (BTC) as ligand; and a solvent; the molar ratio of each component is as follows: $Al^{3+}$: benzene-1,3,5-tricarboxylic acid (BTC): solvent=3:1: 120-300;

(2) reaction solvent:

the solvent is a fatty alcohol of less than 5 carbon atoms or a mixed solvent; the mixed solvent is a fatty alcohol in combination with N,N-dimethylformamide (DMF) or mixture of two or more of the fatty alcohols, the ratio of each component of the mixed solvent is adjusted if desired;

(3) reaction conditions:

the MOF-based hierarchical porous material (except IPD-mesoMOF-3) is synthesized by solvothermal method or microwave synthesis method. The reaction temperatures are as follows:

for IPD-mesoMOF-1(Fe, Al, Sc and In): 90-100° C., solvothermal treatment for 10-24 hr, or microwave heating for 3-5 min;

for IPD-mesoMOF-1(Cr): 130-160° C., solvothermal treatment for 4-5 hr, or microwave heating for 2-3 min;

for IPD-mesoMOF-2: 90-120° C., solvothermal treatment for 14-24 hr, or microwave heating for 8-12 min;

for IPD-mesoMOF-3: room temperature 20-35° C., ultrasonic treatment for 0.5-2 hr;

for IPD-mesoMOF-4: 110-130° C., solvothermal treatment for 18-28 hr, or microwave heating for 8-12 min;

for IPD-mesoMOF-5: 110-130° C., solvothermal treatment for 18-28 hr, or microwave heating for 8-12 min;

for IPD-mesoMOF-6: 130-160° C., solvothermal treatment for 3-5 hr, or microwave heating for 3-5 min;
for IPD-mesoMOF-7: 130-160° C., solvothermal treatment for 3-5 hr, or microwave heating for 3-5 min;
for IPD-mesoMOF-8: 130-160° C., solvothermal treatment for 3-5 hr, or microwave heating for 3-5 min;
for IPD-mesoMOF-9: 90-120° C., solvothermal treatment for 14-24 hr, or microwave heating for 8-12 min;

(4) regulation of stacking density of MOF nanoparticles:
(i) adding tetraalkylammonium halide (the alkyl is selected from methyl, ethyl, propyl, and butyl; halide ion is $Cl^-$ or $Br^-$) into the reaction mixture as filler to expand the interparticle pores or control over the size of MOF nanoparticles and allow them to closely pack in order to generate the hierarchical porous material (monolithic xerogel) comprising micropores and mesopores, termed as A-Form material, marked as IPD-mesoMOF-nA (n=1-9);
(ii) adding NaCl nanoparticles with particle size of 50-500 nm into the reaction mixture at a molar ratio of MOF constituting metal ion to NaCl nanoparticle below 1:10 to afford the MOF-based hierarchical porous material (monolithic xerogel) comprising micropores, mesopores and macropores, termed as B-Form material, marked as IPD-mesoMOF-nB (n=1-9); or
(iii) drying the sol/gel of IPD-mesoMOF-n (n=1-9) with supercritical $CO_2$ to afford the MOF-based hierarchical porous material (monolithic aerogel) comprising micropores, mesopores and macropores, marked as IPD-mesoMOF-nC (n=1-9); and (5) Post-treatment of materials:
(i) cooling the reaction to room temperature upon completion of the reaction, preparing the resulting sol or gel product mixture as xerogel either by first filtration/centrifugation and then drying in air, or direct evaporation of the solvent in air, giving rise to raw product of IPD-mesoMOF-n, extracting and washing the xerogel obtained in Soxhlet extractor with anhydrous ethanol or methanol for over 6 hr to remove by-products and unreacted starting materials, and drying under vacuum to obtain A-Form of the MOF-based hierarchical porous material;
(ii) cooling the reaction to room temperature upon completion of the reaction, preparing the resulting sol or gel product mixture as xerogel either by first filtration/centrifugation and then drying in air, or direct evaporation of the solvent in air, giving rise to raw product of IPD-mesoMOF-n, washing the xerogel obtained with deionized water to remove NaCl, then extracting and washing in Soxhlet extractor with anhydrous ethanol or methanol for over 6 hr, and drying under vacuum to obtain B-Form of the MOF-based hierarchical porous material; or
(iii) cooling the reaction to room temperature upon the reaction completed, preparing the resulting sol (or gel) product mixture as aerogel by direct supercritical $CO_2$ extraction to obtain C-Form of the MOF-based hierarchical porous material.

5. A method of regulating the size of mesopores of IPD-mesoMOF-nA materials of claim 4, which comprises adding tetraalkylammonium halide into the reaction mixture, wherein the alkyl group is independently selected from methyl, ethyl, propyl and butyl; and the halide ion is Cl— or Br—.

6. A method of regulating the size of mesopores of IPD-mesoMOF-nA materials of claim 4, which comprises the use of a mixed solvent of fatty alcohols of less than 5 carbon atoms, wherein the ratio of each component of the mixed solvent is adjusted according to claim 4.

7. A preparation method for IPD-mesoMOF-nB of claim 4, which comprises adding sodium chloride nanoparticles into the reaction mixture for IPD-mesoMOF-nA Form material, wherein particle size of NaCl nanoparticles is 50-500 nm and the molar ratio of MOF constituting metal ion to NaCl nanoparticle is below 1:10.

8. A preparation method for IPD-mesoMOF-nC of claim 4, comprising supercritical $CO_2$ extraction of the sol/gel reaction mixture to obtain the MOF-based hierarchical porous material as an aerogel.

* * * * *